United States Patent
Anabuki et al.

(10) Patent No.: US 10,262,199 B2
(45) Date of Patent: Apr. 16, 2019

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Mahoro Anabuki, Yokohama (JP); Yasuo Katano, Kawasaki (JP); Masakazu Matsugu, Yokohama (JP); Masahiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 423 days.

(21) Appl. No.: 14/156,337

(22) Filed: Jan. 15, 2014

(65) Prior Publication Data
US 2014/0198962 A1    Jul. 17, 2014

(30) Foreign Application Priority Data

Jan. 17, 2013   (JP) .................................. 2013-006308

(51) Int. Cl.
*G06T 7/00* (2017.01)
*G06K 9/00* (2006.01)

(52) U.S. Cl.
CPC ........ *G06K 9/00369* (2013.01); *G06T 7/0014* (2013.01); *G06T 2207/30004* (2013.01); *G06T 2207/30196* (2013.01)

(58) Field of Classification Search
CPC .............. G06K 9/00369; G06T 7/0014; G06T 2207/30004; G06T 2207/30196
See application file for complete search history.

(56) References Cited

U.S. PATENT DOCUMENTS 4,905,151 A * 2/1990 Weiman ............... G05D 1/0253
                                                   180/167
5,228,856 A * 7/1993 Chang ..................... G09B 9/326
                                                   434/44
(Continued)

FOREIGN PATENT DOCUMENTS

JP    2011-023118   *  2/2011  ............... H04N 5/00
JP    4654905 B2       3/2011
(Continued)

OTHER PUBLICATIONS

Waldherr, S. "A Gesture Based Interface for Human-Robot Interaction" Autonomous Robots Sep. 2000, vol. 9, Issue 2, pp. 151-173.*

(Continued)

*Primary Examiner* — Mia M Thomas
(74) *Attorney, Agent, or Firm* — Canon USA Inc., IP Division

(57) ABSTRACT

In order to reduce limitations on an arrangement of a posture visualization system as a whole, a posture recognition unit recognizes, based on image data of a real space captured by an image capture unit from a predetermined viewpoint, a posture of an object in the image data of the real space. A posture visualization viewpoint setting unit sets a viewpoint different from the predetermined viewpoint. A posture visualization unit visualizes a mirror image of the posture of the object viewed from the viewpoint set by the posture visualization viewpoint setting unit based on the posture recognized by the posture recognition unit. A space display unit displays the mirror image of the posture of the object generated by the posture visualization unit and a mirror image of the real space at once.

8 Claims, 15 Drawing Sheets

(56) References Cited

U.S. PATENT DOCUMENTS

| | | | | |
|---|---|---|---|---|
| 5,495,576 A * | 2/1996 | Ritchey | G06T 17/00 | 345/420 |
| 5,748,198 A * | 5/1998 | Takeda | A63F 13/10 | 345/441 |
| 5,966,132 A * | 10/1999 | Kakizawa | A63F 13/10 | 345/419 |
| 6,147,716 A * | 11/2000 | Ohki | G06T 3/00 | 348/584 |
| 6,445,815 B1 * | 9/2002 | Sato | G06T 7/0042 | 348/E13.008 |
| 6,721,444 B1 * | 4/2004 | Gu | B25J 9/1697 | 345/419 |
| 6,734,854 B1 * | 5/2004 | Shimizu | G06T 15/405 | 345/422 |
| 7,161,616 B1 * | 1/2007 | Okamoto | B60R 1/00 | 348/148 |
| 7,277,123 B1 * | 10/2007 | Okamoto | B60R 1/00 | 348/148 |
| 7,289,130 B1 * | 10/2007 | Satoh | A63F 13/10 | 345/629 |
| 8,187,092 B2 * | 5/2012 | Dixon | G07F 17/3211 | 463/30 |
| 8,432,436 B2 * | 4/2013 | Debevec | G02B 27/225 | 348/51 |
| 8,884,947 B2 * | 11/2014 | Tomite | G06T 19/00 | 345/419 |
| 9,248,376 B2 * | 2/2016 | Yoshikawa | A63F 13/10 | |
| 9,332,247 B2 * | 5/2016 | Yamato | G03B 35/08 | |
| 9,517,001 B2 * | 12/2016 | Chiba | A61B 1/00158 | |
| 9,681,119 B2 * | 6/2017 | Hagiwara | H04N 13/239 | |
| 9,800,859 B2 * | 10/2017 | Venkataraman | G01P 3/38 | |
| 9,823,739 B2 * | 11/2017 | Kasahara | G06F 3/011 | |
| 2001/0024972 A1 * | 9/2001 | Kitao | A63F 13/10 | 463/33 |
| 2002/0154070 A1 * | 10/2002 | Sato | H04N 5/2224 | 345/8 |
| 2002/0171666 A1 * | 11/2002 | Endo | G06T 13/00 | 345/619 |
| 2003/0080979 A1 * | 5/2003 | Satoh | G06F 3/012 | 345/633 |
| 2003/0114742 A1 * | 6/2003 | Lewkowicz | A61B 1/00147 | 600/407 |
| 2003/0117392 A1 * | 6/2003 | Harvill | G06T 17/10 | 345/419 |
| 2003/0184567 A1 * | 10/2003 | Fujiki | G06T 15/20 | 345/660 |
| 2004/0041822 A1 * | 3/2004 | Iizuka | G06T 15/005 | 345/634 |
| 2004/0223190 A1 * | 11/2004 | Oka | G06T 15/205 | 358/302 |
| 2005/0031166 A1 * | 2/2005 | Fujimura | G06K 9/00369 | 382/103 |
| 2005/0151732 A1 * | 7/2005 | Yamaguchi | G06T 15/10 | 345/421 |
| 2005/0219239 A1 * | 10/2005 | Mashitani | H04N 13/0003 | 345/419 |
| 2005/0231532 A1 * | 10/2005 | Suzuki | G06F 3/012 | 345/633 |
| 2006/0010699 A1 * | 1/2006 | Tamura | G01C 17/28 | 33/355 R |
| 2006/0082879 A1 * | 4/2006 | Miyoshi | H04N 13/218 | 359/462 |
| 2007/0009135 A1 * | 1/2007 | Ishiyama | G06T 7/0048 | 382/103 |
| 2007/0060798 A1 * | 3/2007 | Krupnik | A61B 1/00045 | 600/300 |
| 2007/0076919 A1 * | 4/2007 | Blonde | G06T 7/20 | 382/107 |
| 2007/0182761 A1 * | 8/2007 | Kuroki | G06T 11/206 | 345/632 |
| 2007/0216679 A1 * | 9/2007 | Nakamura | A63F 13/10 | 345/423 |
| 2007/0258658 A1 * | 11/2007 | Kobayashi | G06T 15/20 | 382/276 |
| 2008/0013809 A1 * | 1/2008 | Zhu | A61B 34/20 | 382/128 |
| 2008/0123910 A1 * | 5/2008 | Zhu | A61B 90/36 | 382/128 |
| 2008/0226179 A1 * | 9/2008 | Dohta | A63F 13/00 | 382/232 |
| 2008/0267450 A1 * | 10/2008 | Sugimoto | A63H 17/395 | 382/103 |
| 2008/0294985 A1 * | 11/2008 | Milov | G06F 11/3664 | 715/704 |
| 2009/0040235 A1 * | 2/2009 | Matsuda | A61B 1/00045 | 345/619 |
| 2009/0059366 A1 * | 3/2009 | Imai | G02B 27/2242 | 359/464 |
| 2009/0066725 A1 * | 3/2009 | Nogami | A63F 13/10 | 345/632 |
| 2009/0080780 A1 * | 3/2009 | Ikeda | G06T 7/0046 | 382/209 |
| 2009/0128552 A1 * | 5/2009 | Fujiki | G06T 15/06 | 345/419 |
| 2009/0154770 A1 * | 6/2009 | Akiyama | G01C 21/30 | 382/103 |
| 2009/0161949 A1 * | 6/2009 | Milov | G06F 11/3664 | 382/162 |
| 2009/0278948 A1 * | 11/2009 | Hayashi | H04N 5/2226 | 348/218.1 |
| 2009/0303246 A1 * | 12/2009 | Tsuda | G06F 3/04815 | 345/592 |
| 2010/0161409 A1 * | 6/2010 | Ryu | G06Q 30/02 | 705/14.43 |
| 2010/0185225 A1 * | 7/2010 | Albrecht | A61B 5/036 | 606/191 |
| 2010/0231581 A1 * | 9/2010 | Shroads | G06T 11/206 | 345/419 |
| 2010/0315415 A1 * | 12/2010 | Asami | A63B 24/0003 | 345/419 |
| 2010/0329521 A1 * | 12/2010 | Beymer | A61B 8/08 | 382/128 |
| 2011/0032259 A1 * | 2/2011 | Kim | A61B 1/041 | 345/428 |
| 2011/0074781 A1 * | 3/2011 | Miyamoto | A61B 6/466 | 345/426 |
| 2011/0075901 A1 * | 3/2011 | Nakamura | G06F 19/321 | 382/128 |
| 2011/0122130 A1 * | 5/2011 | Vesely | G06T 15/20 | 345/419 |
| 2011/0194779 A1 * | 8/2011 | Zhong | G06K 9/6203 | 382/218 |
| 2011/0245660 A1 * | 10/2011 | Miyamoto | A61B 6/032 | 600/424 |
| 2012/0052959 A1 * | 3/2012 | Nishida | A63F 13/12 | 463/47 |
| 2012/0115598 A1 * | 5/2012 | Hagstrom | G06T 19/006 | 463/31 |
| 2012/0169850 A1 * | 7/2012 | Kim | H04N 5/2252 | 348/47 |
| 2012/0212491 A1 * | 8/2012 | Hager | G06T 15/04 | 345/426 |
| 2012/0229462 A1 * | 9/2012 | Eichenlaub | G02B 27/2214 | 345/419 |
| 2012/0249741 A1 * | 10/2012 | Maciocci | G06F 3/011 | 348/46 |
| 2012/0281002 A1 * | 11/2012 | Ward | G06T 15/30 | 345/501 |
| 2012/0293693 A1 * | 11/2012 | Sumitomo | H04N 13/0221 | 348/246 |
| 2012/0327125 A1 * | 12/2012 | Kutliroff | G06F 3/017 | 345/660 |
| 2013/0113784 A1 * | 5/2013 | White | H04N 13/0011 | 345/419 |
| 2013/0136304 A1 * | 5/2013 | Anabuki | G06K 9/00362 | 382/103 |
| 2013/0178257 A1 * | 7/2013 | Langseth | G06T 17/05 | 463/4 |

(56) References Cited

U.S. PATENT DOCUMENTS

| | | | |
|---|---|---|---|
| 2013/0211419 A1* | 8/2013 | Jensen | A61B 6/4405 606/130 |
| 2013/0211420 A1* | 8/2013 | Jensen | A61B 19/2203 606/130 |
| 2013/0223702 A1* | 8/2013 | Holsing | G06T 1/00 382/128 |
| 2013/0300828 A1* | 11/2013 | Yamato | G03B 35/08 348/44 |
| 2013/0307976 A1* | 11/2013 | Kiura | H04N 5/232 348/143 |
| 2013/0316815 A1* | 11/2013 | Fujii | A63F 13/5255 463/31 |
| 2013/0336528 A1* | 12/2013 | Itani | G06F 3/017 382/103 |
| 2014/0036046 A1* | 2/2014 | Hasegawa | H04N 13/0409 348/54 |
| 2014/0135117 A1* | 5/2014 | Abe | A63F 13/06 463/31 |
| 2014/0292645 A1* | 10/2014 | Tsurumi | G06F 3/011 345/156 |
| 2014/0357358 A1* | 12/2014 | Shikata | A63F 13/00 463/31 |
| 2015/0023589 A1* | 1/2015 | Kataoka | G06T 15/20 382/154 |
| 2015/0063640 A1* | 3/2015 | Anabuki | G06T 7/20 382/103 |
| 2015/0138232 A1* | 5/2015 | Sugimoto | G06F 3/1205 345/633 |
| 2015/0138329 A1* | 5/2015 | Braun | A61B 5/6861 348/71 |
| 2015/0146964 A1* | 5/2015 | Tai | G06T 19/20 382/141 |
| 2015/0237338 A1* | 8/2015 | Grossman | H04N 13/0434 348/53 |
| 2015/0264339 A1* | 9/2015 | Riedel | G02B 27/2235 348/54 |
| 2015/0281673 A1* | 10/2015 | Didier | G06K 9/00255 348/50 |
| 2015/0312559 A1* | 10/2015 | Ueno | H04N 13/0014 348/53 |
| 2015/0339537 A1* | 11/2015 | Ikeda | H04N 5/232 382/103 |
| 2016/0054793 A1* | 2/2016 | Kasahara | G06F 3/0488 345/633 |
| 2016/0086023 A1* | 3/2016 | Anabuki | G06K 9/00362 382/103 |
| 2017/0078558 A1* | 3/2017 | Tamura | H04N 5/23212 |
| 2017/0094254 A1* | 3/2017 | Lee | H04N 13/106 |
| 2017/0171570 A1* | 6/2017 | Mitsumoto | H04N 21/21805 |
| 2017/0208292 A1* | 7/2017 | Smits | H04N 13/243 |
| 2018/0068462 A1* | 3/2018 | Wakai | G01B 21/042 |
| 2018/0085002 A1* | 3/2018 | Glinec | G06T 7/73 |
| 2018/0316912 A1* | 11/2018 | Wakai | H04N 17/002 |

FOREIGN PATENT DOCUMENTS

| | | | | |
|---|---|---|---|---|
| JP | WO 2012/011263 | * | 1/2012 | G06F 3/01 |
| WO | 2009/153975 A1 | | 12/2009 | |

OTHER PUBLICATIONS

J. Shotton, et al., Real-Time Human Pose Recognition in Parts from Single Depth Images, DVPR 2011, 8 pages.

Pere-Pau Vazquez, et al., Automatic View Selection Using Viewpoint Entropy and its Application to Image-Based Modelling, Computer Graphics Forum, vol. 22, Issue 4, pp. 689-700, Dec. 2003, 11 pages.

Peter M. Hall, et al., Simple Canonical Views, BMVC 2005, 10 pages.

Richard A. Newcombe, et al., KinectFusion: Real-Time Dense Surface Mapping and Tracking, IFEE, Oct. 2011, 10 pages.

\* cited by examiner

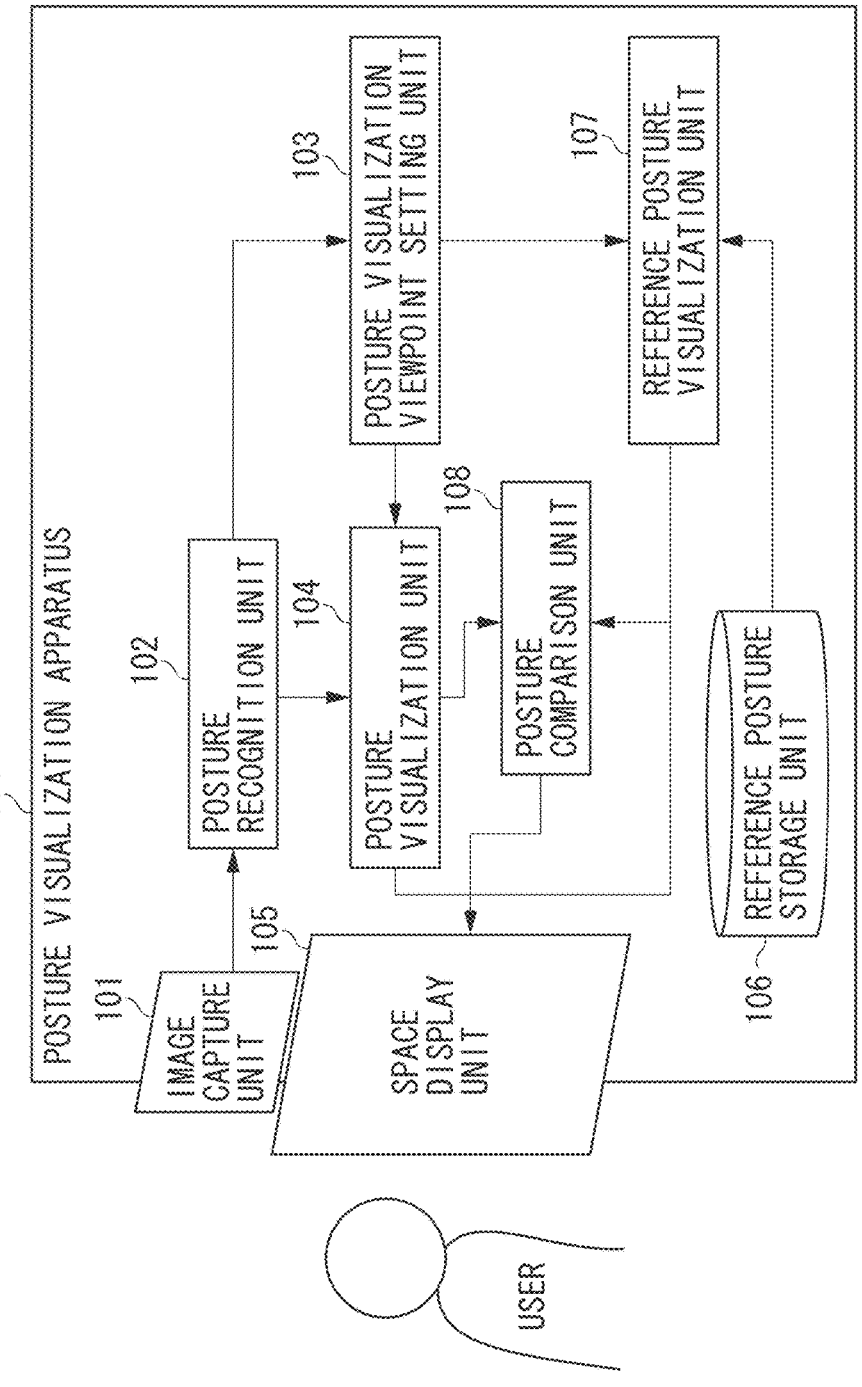

EXAMPLE OF FRONT VIEW OF HUMAN BODY MODEL

EXAMPLE OF SIDE VIEW OF HUMAN BODY MODEL

EXAMPLE OF HUMAN BODY MODEL WHEN STANDING STRAIGHT

EXAMPLE OF HUMAN BODY MODEL WHEN BENDING OVER

INFORMATION PROCESSING APPARATUS, INFORMATION PROCESSING METHOD, AND STORAGE MEDIUM

BACKGROUND OF THE INVENTION

Field of the Invention

The present invention relates to a technique of visualizing a posture.

Description of the Related Art

Leaning of a posture of a person standing normally with his face facing forward is one of indicators for determining the person's health condition. For example, a person suffering from cerebellar infraction might have disorder of the sense of equilibrium, and thus might not be able to stand straight and stagger. A person suffering from Parkinson's disease standing straight might gradually lean diagonally forward due to the person's stiff body muscles. A person who is not suffering from such diseases might have an unbalanced posture with the person's left and right shoulder heights different from each other or have a slouching posture which might cause pain in body parts such a neck, a hip, and the like, or adversely affect the function of autonomic nerves to impair the function of internal organs. As described above, whether a person is standing still is an indicator for determining his or her health condition.

For example, a person can check whether the person can stand straight by standing in front of a mirror and see the person in the mirror so that the person can visually check whether the person's body is leaning left or right. However, whether the person's body is leaning front or back cannot be clearly checked just by looking at the mirror. A person can see a side view instead of a frontal view of the person's body on a mirror by standing sideways against the mirror with the person's face facing the mirror. However, this posture, which is not "posture of a person normally standing with the person's face facing forward to a mirror", does not allow the person to correctly estimate the person's health condition. Furthermore, a person standing this way cannot see whether the person is leaning left or right.

For example, a technique allowing a user facing forward to see the user's posture viewed from a position other than the front is discussed in Japanese Patent No. 4,654,905. In the technique discussed in Japanese Patent No. 4,654,905, the user is image-captured from a position other than the front and the captured image can be displayed from behind a half mirror positioned to face front to the user. When the user is image-captured from a side of the user with this technique, the captured image is displayed in front of the user. Thus, the user can check how much the user is leaning forward or backward with the user's eyes while facing forward. Here, a frontal posture of the user is displayed on the half mirror disposed at a position to face front to the user, and thus the user can also check how much the user is leaning left or right with the user's eyes.

In the technique discussed in Japanese Patent No. 4,654,905, an image capture unit needs to be positioned to be capable of capturing an image of the posture other than the frontal posture to be displayed to the user. The image capture unit is fixedly disposed, and thus an orientation of the posture to be displayed to the user cannot be freely changed. Therefore, an orientation of the standing user might need to be fixed to capture an image of the posture that allows a user to check whether the user is leaning forward, backward, leftward, and rightward.

SUMMARY OF THE INVENTION

According to an aspect of the present invention, an image processing apparatus includes a recognition unit configured to recognize, based on image data of a real space captured by an image capture unit from a predetermined viewpoint, a posture of an object in the image data of the real space, a setting unit configured to set a viewpoint different from the predetermined viewpoint, a generation unit configured to generate an image of the posture of the object viewed from the viewpoint set by the setting unit based on the posture recognized by the recognition unit, and a display control unit configured to display the image of the posture of the object generated by the generation unit on a display unit.

With the technique described in this specification, limitations on the arrangement of a posture visualization system as a whole can be reduced.

Further features of the present invention will become apparent from the following description of exemplary embodiments with reference to the attached drawings.

BRIEF DESCRIPTION OF THE DRAWINGS

FIG. 1 is a block diagram illustrating a configuration of a posture visualization apparatus according to a first exemplary embodiment of the present invention.

DESCRIPTION OF THE EMBODIMENTS

Figure 2A:
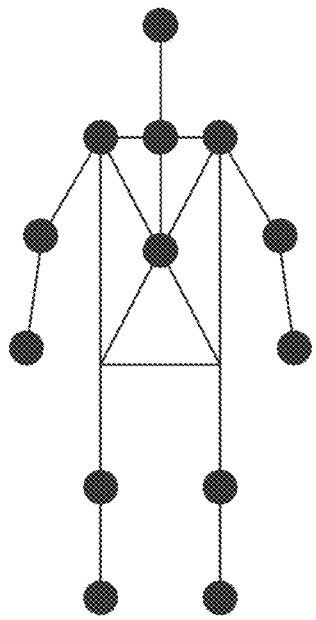
FIGS. 2A and 2B are diagrams each illustrating an example human body model.

Various exemplary embodiments, features, and aspects of the invention will be described in detail below with reference to the drawings.

First of all, a first exemplary embodiment of the present invention will be described. A posture visualization apparatus according to the first exemplary embodiment of the present invention is installed in an operating room of an orthopedics, a rehabilitation room in a hospital, and the like. The posture visualization apparatus is used by a patient (hereinafter referred to as user) who came to the room and under an instruction by a physiotherapist. The posture visualization apparatus according to the first exemplary embodiment visualizes a forward leaning level of the posture so that a user squatting while facing forward to the posture visualization apparatus can see and check the level. Thus, the posture visualization apparatus displays the visualization result to the user together with the user's frontal posture.

FIG. 1 is a block diagram illustrating a configuration of a posture visualization apparatus 100 according the first exemplary embodiment. As illustrated in FIG. 1, the posture visualization apparatus 100 includes an image capture unit 101, a posture recognition unit 102, a posture visualization viewpoint setting unit 103, a posture visualization unit 104, a space display unit 105, a reference posture storage unit 106, a reference posture visualization unit 107, and a posture comparison unit 108. The posture recognition unit 102, the posture visualization viewpoint setting unit 103, the posture visualization unit 104, the reference posture visualization unit 107, and the posture comparison unit 108 are functional configurations implemented when a central processing unit (CPU) in the posture visualization apparatus 100 reads and executes required data and a program in a recording medium such as a hard disk drive (HDD). The reference posture storage unit 106 serves as a partial storage area in the recording medium such as the HDD. The posture visualization apparatus 100 illustrated in FIG. 1 has a configuration as an example of an image processing apparatus.

The image capture unit 101 is a distance measurement camera that measures a distance between an imaging viewpoint (hereinafter referred to as first viewpoint) and an object in a field of view, and outputs the resultant distance information. The distance information includes, for example, distance image data obtained by converting the measured distance values into pixel values.

The image capture unit 101 is positioned in such a manner that a distance measurement area is set in front of the space display unit 105 described below. For example, the image capture unit 101 is disposed above the space display unit 105 while facing diagonally downwards. Thus, the image capture unit 101 can measure a human body shape of a user of the posture visualization apparatus 100 standing in front of the space display unit 105.

A distance measurement method performed by the image capture unit 101 includes, for example, a stereo method using image data pieces captured by a plurality of visible light cameras, a Time-Of-Flight method, a triangulation method conducted through pattern projection, and a method based on defocus information of an imaging optical system. The image capture unit 101 outputs the distance information to the posture recognition unit 102.

The posture recognition unit 102 receives the distance information from the image capture unit 101, and three dimensionally recognizes a posture of the user from the human body shape of the user included in the distance information. In other words, the posture recognition unit 102 recognizes three dimensional positions of parts of the human body of the user viewed from the first viewpoint.

A method for recognizing a posture of a person from the distance information including the human body shape of the user is discussed in, for example, J. Shotton, A. Fitzgibbon, M. Cook, T. Sharp, M. Finocchio, R. Moore, A. Kipman, and A. Blake: Real-Time Human Pose Recognition in Parts from a Single Depth Image. CVPR 2011.

Figure 2B:
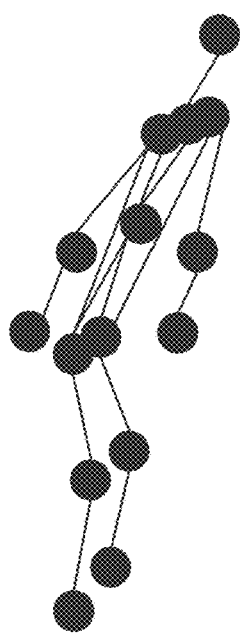

The posture of a person is recognized as follows if the distance information is distance image data. First, the posture recognition unit 102 divides the distance image data received from the image capture unit 101 into areas based on the pixel values. Then, the posture recognition unit 102 extracts as human body areas from the areas, those of which the distance from the position of the imaging viewpoint of the image capture unit 101 is about 1 to 4 m, and the size is equal to or larger than a certain reference size. Then, the posture recognition unit 102 applies the extracted body areas to a (three dimensional) human body model prepared in advance by three dimensionally modifying positions and orientations of the parts (such as a head, a hand, a foot, a torso, and the like forming a human body) of the human body. After appropriately applying the extracted human body areas to the human body model, the posture recognition unit 102 obtains as the recognition result, the posture of the person indicated by the human body model, that is, positions of the parts relative to the first viewpoint. The positions of the parts as the posture recognition result of a person are displayed as illustrated in FIG. 2A or FIG. 2B in which the parts are represented by spheres and a connection between the parts is represented by a line. FIG. 2A illustrates an example of the human body model viewed from the image capture unit 101 (front view). FIG. 2B illustrates an example of a side view of the human body model.

Figure 3A:
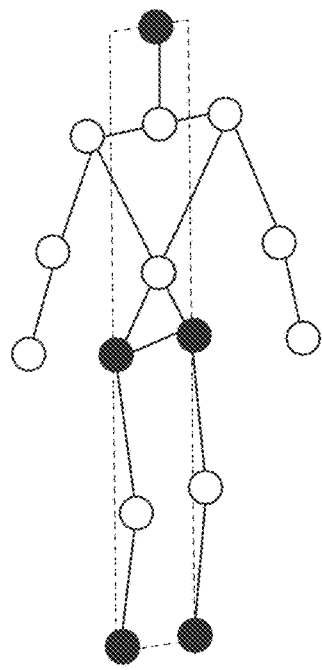
FIGS. 3A and 3B are diagrams each illustrating an example human body model.
Figure 3B:
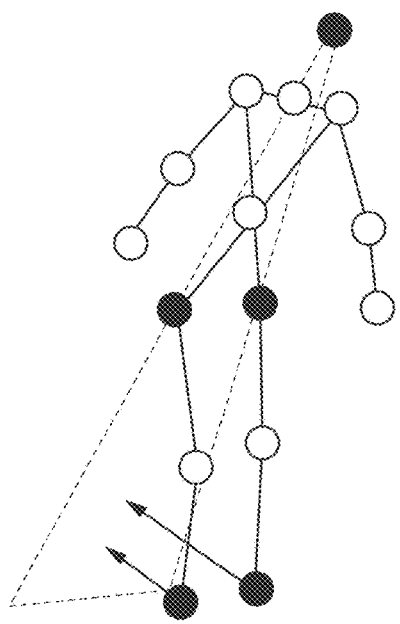

If the user is standing straight with a straight back, a positional relationship is achieved where the parts of the head, left and right parts of hip, and left and right feet in the posture recognition result is substantially on a single plane as illustrated in FIG. 3A. If the user is bending over, a positional relationship is obtained where the parts of left and right feet are not on a plane defined by three points at the positions of the head, and the left and right part of hip in the posture recognition result as illustrated in FIG. 3B.

Other methods of recognizing the posture include learning a large amount of associations between distance information and a posture of a person (positional relationship between parts) in advance and determining the posture of the person corresponding to input distance information based on a result of the learning. The posture recognition unit 102 outputs the posture recognition result to the posture visualization viewpoint setting unit 103 and the posture visualization unit 104.

The posture visualization viewpoint setting unit 103 sets a position and an orientation of a viewpoint from which a posture to be displayed to the user is viewed. The position and orientation set herein are a position and an orientation relative to the user, and are different from those of the first viewpoint to the user. The space displayed by the space display unit 105 to be described below virtually includes the user, and the position and orientation set herein are also different from those of a viewpoint (hereinafter referred to as second viewpoint) for displaying the space relative to the user in the space.

Figure 4:
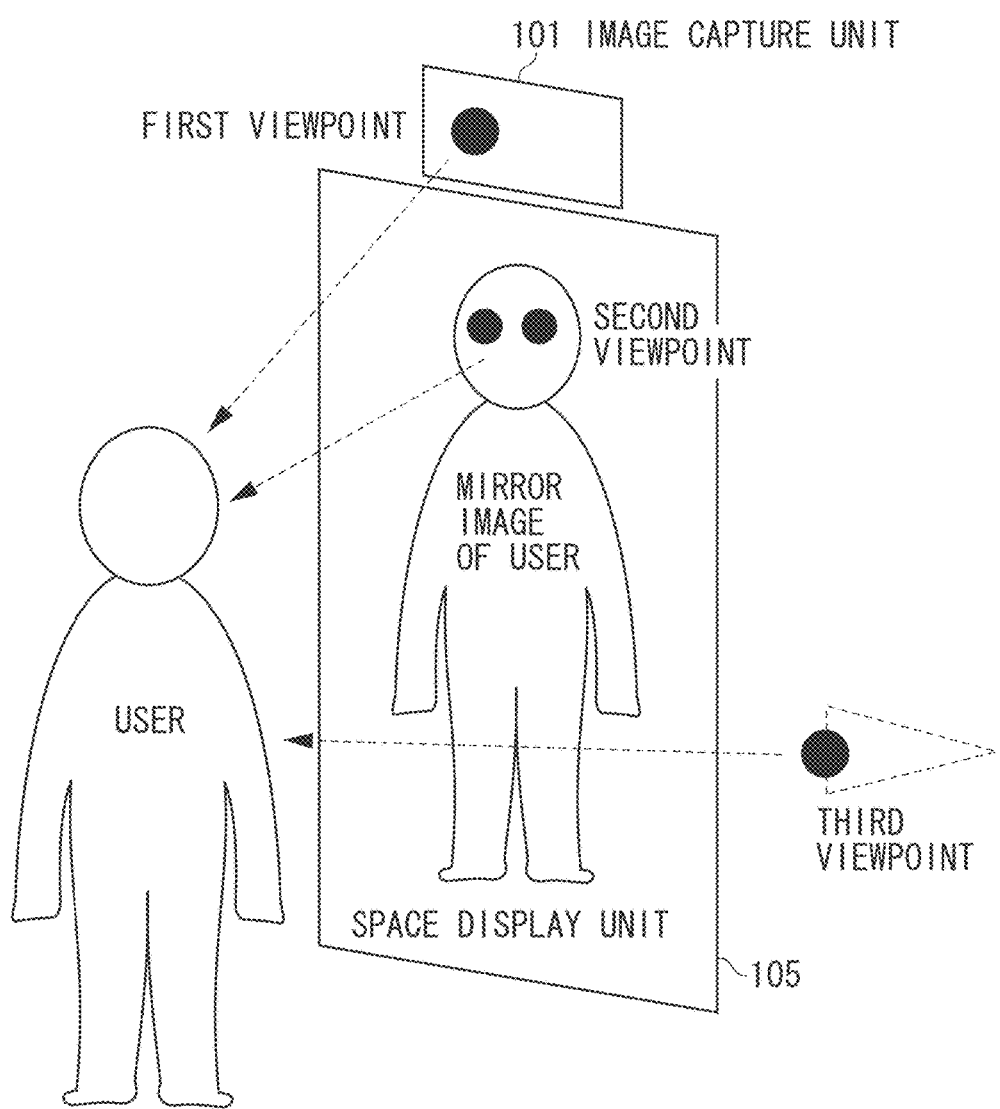
FIG. 4 is a diagram illustrating a positional relationship among first, second, and third viewpoints.

Thus, the posture visualization viewpoint setting unit 103 sets a third viewpoint different from the first and the second viewpoints in the position and orientation, as a viewpoint for viewing a posture displayed to the user. FIG. 4 is a diagram illustrating a positional relationship among the first, the second, and the third viewpoints. How the posture visualization viewpoint setting unit 103 sets the third viewpoint different from the first and the second viewpoints will be described below. The position and orientation of the third viewpoint set by the posture visualization viewpoint setting unit 103 are output to the posture visualization unit 104 and the reference posture visualization unit 107.

The posture visualization unit 104 visualizes the posture to be displayed to the user so that the user can see and check the posture. More specifically, based on the posture recognition result received from the posture recognition unit 102, the posture visualization unit 104 visualizes a mirror image of a posture of the user viewed from the third viewpoint received from the posture visualization viewpoint setting unit 103. For example, the posture visualization unit 104 provides sphere computer graphics (CG) at positions of the human body parts in the posture recognition result, and provides thin cylinder CG between connected human parts, so that the posture of the user is visualized as the human body models illustrated in FIGS. 2A and 2B. The posture visualization unit 104 disposes a virtual camera to have the position and orientation of the third viewpoint relative to the human model. The posture visualization unit 104 obtains image data of the human body model viewed from the virtual camera as a visualization result, and outputs the visualization result to the space display unit 105 and the posture comparison unit 108.

Figure 5:
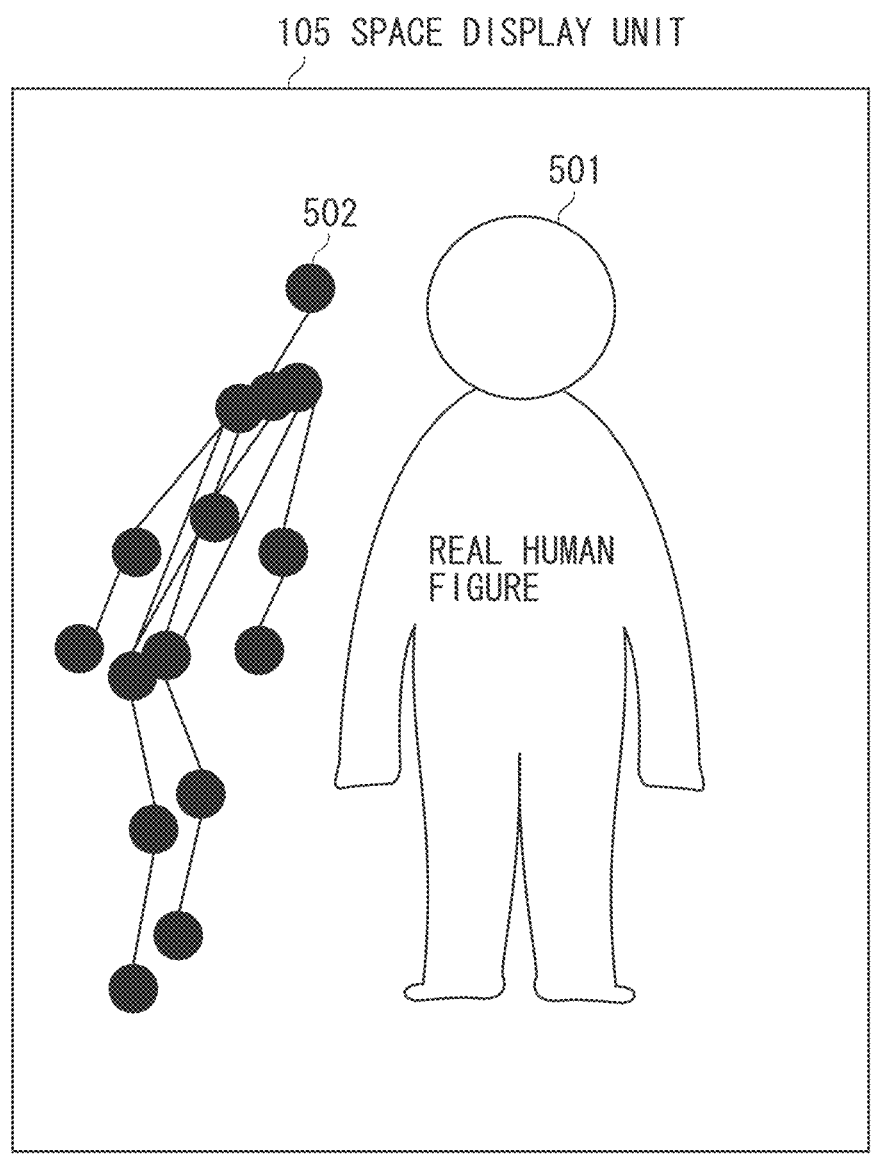
FIG. 5 is a diagram illustrating a displayed content on a space display unit seen by a user.

The space display unit 105 is formed by disposing a display behind a half mirror. The half mirror displays a mirror image of a real space as viewed from a mirror image position of the user viewpoint, which has been described as "the second viewpoint" for displaying the space with the space display unit 105. A mirror image of a posture of the user viewed from the third viewpoint received from the posture visualization unit 104 is visualized and displayed on the display. Therefore, the user standing in front of the space display unit 105 can see the mirror image of the real space including the user's figure viewed from the front (from the second viewpoint), and the visualization result of the posture of the user viewed from the position other than the front (from the third viewpoint different from the second viewpoint). FIG. 5 is a diagram illustrating an example of a displayed content on the space display unit 105 seen by the user including a mirror image 501 of the real space including the figure of the user viewed from the second viewpoint and a visualization result 502 of the posture viewed from the third viewpoint.

The visualization result of a mirror image of the reference posture received from the reference posture visualization unit 107 and the posture comparison result received from the posture comparison unit 108 are also displayed on the display configuring the space display unit 105.

The reference posture storage unit 106 stores therein posture data representing the reference posture used for rehabilitation. The reference posture storage unit 106 stores therein posture data representing a reference posture of a squatting user because the posture visualization apparatus 100 according to the present exemplary embodiment visualizes and displays the mirror image of the posture of the squatting user.

The reference posture is a correct squatting posture, for example. The correct squatting posture is, for example, a posture in which the upper half of the body of a person bending the user's knees is orthogonal to the ground. In comparison, a bad squatting posture is, for example, a posture in which the upper half of the body of a person bending the user's knees is leaning forward. The reference posture may be a posture of a user in the past for example.

The posture data is equivalent to the posture recognition result output from the posture recognition unit 102. That is, the posture data stored in the reference storage unit 106 represents relative positional relationship among parts of the human body. The reference posture visualization unit 107 refers to the posture data stored in the reference storage unit 106.

The reference posture visualization unit 107 visualizes the reference posture to be displayed to the user so that the user can see and check the reference posture. More specifically, the reference posture visualization unit 107 visualizes posture data stored in the reference posture storage unit 106 based on the position and orientation of the third viewpoint received from the posture visualization viewpoint setting unit 103. The visualized posture is a mirror image of a posture viewed from the third viewpoint when the user takes the reference posture. This visualization may be performed in the same way as that performed in the posture visualization unit 104. For example, the reference posture visualization unit 107 puts the sphere CG at positions of the human body parts shown in the posture data, and provides thin cylinder CG between the connected human body parts, so that the reference posture is visualized as the human body models illustrated in FIGS. 2A and 2B. The reference posture visualization unit 107 disposes a virtual camera at the position and orientation of the third viewpoint relative to the human figure model. Then, the reference posture visualization unit 107 obtains image data of a human body model viewed from the virtual camera as a visualization result, and outputs the visualization result to the space display unit 105 and the posture comparison unit 108.

Figure 6:
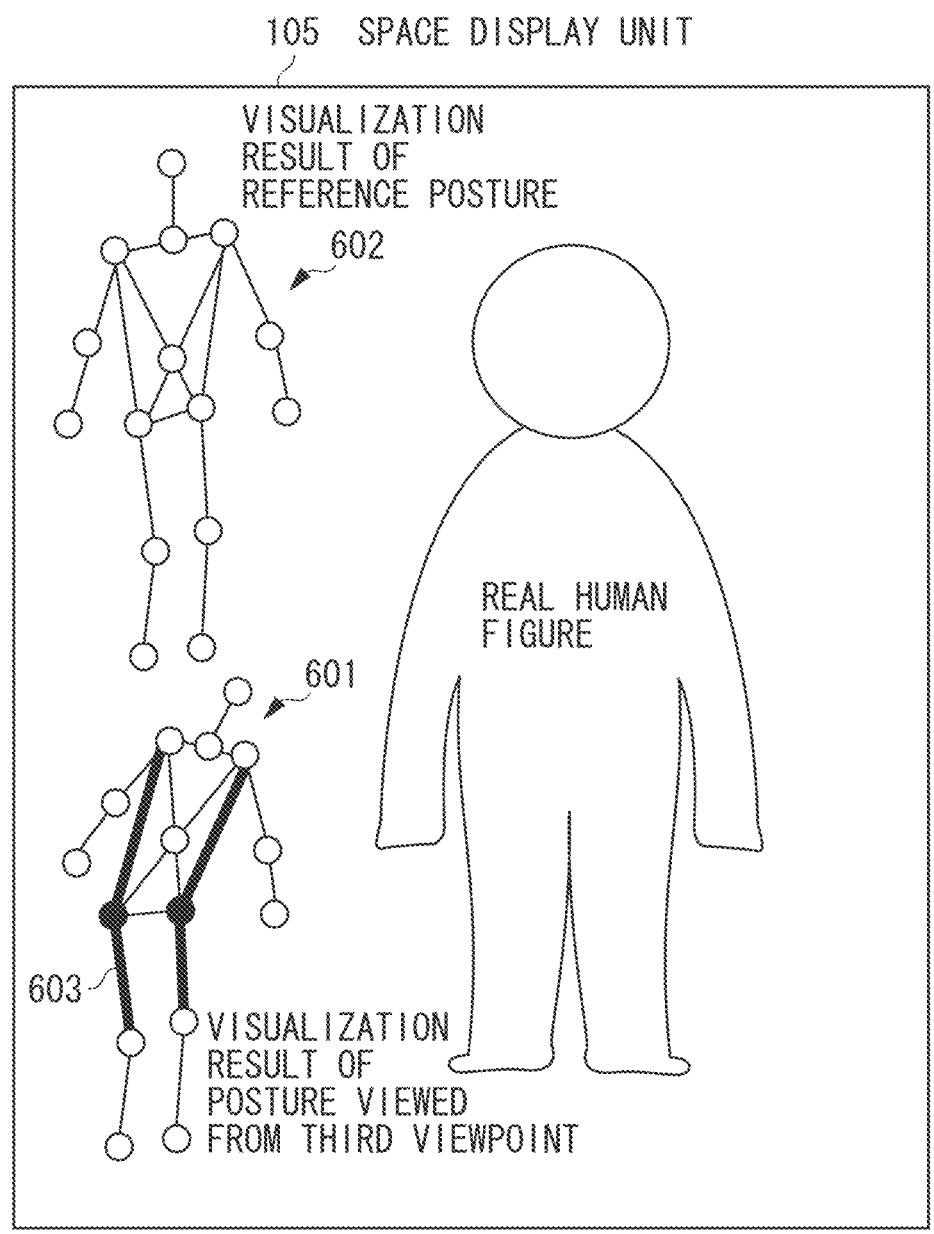
FIG. 6 is a diagram illustrating an example space display unit in which a mirror image of a posture of the user and a mirror image of a reference posture are displayed.

The posture comparison unit 108 compares the mirror image of the posture of the user visualized by the posture visualization unit 104 and the mirror image of the posture of the user visualized by the reference posture visualization unit 107. Thus, the posture comparison unit 108 calculates the difference between the mirror images of the postures. Specifically, the posture comparison unit 108 calculates a difference between the postures in an angle of a hip joint or an angle of a knee joint. For example, the angle of the hip joint is an angle between a vector between the right shoulder and the right part of hip and a vector between the right part of hip and the right knee. For example, the angle of the knee joint is an angle between a vector between the right part of hip and the right knee and a vector between the right knee and the right ankle. The difference between the postures is expressed as a text, a graph, a diagram, or the like. For example, as illustrated in FIG. 6, a mirror image 601 of the posture of the user and a mirror image 602 of the reference posture are displayed at once as the human models illustrated in FIGS. 2A and 2B. Furthermore, body parts 603 largely different between the postures are highlighted in FIG. 6. The result represented as described above is output to and displayed on the space display unit 105 as the posture comparison result.

Now, how the posture visualization viewpoint setting unit 103 sets the third viewpoint different from the first and the second viewpoints will be described. The third viewpoint is set to have the position and orientation that allow the user to more clearly see the leaning of the posture of the user that is difficult to check from the second viewpoint. For example, the user facing forward to the second viewpoint can see the leftward or rightward leaning of the posture, but forward or backward leaning of the posture is difficult for the user to check. Thus, in such a case, the third viewpoint is set to have the position and orientation that allow the user to more clearly see the forward or backward leaning of the posture in the following manner for example.

First, the posture visualization viewpoint setting unit 103 obtains a position B of the first viewpoint (imaging viewpoint of the image capture unit 101) to a part A (a head, a viewpoint, a chest, or the like) of the user based on the posture recognition result received from the posture recognition unit 102. Next, the posture visualization viewpoint setting unit 103 obtains a position B' by setting the position B to have a height component (component in a direction of gravity) that is the same as that of the part A of the user. Then, the posture visualization viewpoint setting unit 103 rotates the position B' about a vertical vector passing through the part A of the user (vector in the direction of gravity) by 90° (or −90°) to obtain a position B'' set as the position of the third viewpoint. Finally, the posture visualization viewpoint setting unit 103 sets a vector in a direction from the position B'' to the part A of the user as the orientation of the third viewpoint. Thus, the third viewpoint is positioned on the right (or the left) side of the user and is oriented toward the part A of the user.

The position B' is rotated about the vertical vector passing through the part A of the user by 90° (or −90°), but the angle is not limited to ±90°, and may be set in accordance with the visibility of the body, for example. The visibility of the body can be defined with entropy for example. More specifically, the entropy E representing the visibility of the body can be formulated as follows:

$$E = -\sum_{i=0}^{m} \frac{A_i}{S} \log_2 \frac{A_i}{S}$$ Formula 1 where S is a two dimensional area of an entire field of view from a certain viewpoint and Ai is a two dimensional area of a partial area of a human body in the field of view.

A large value E indicates that the partial area of the human body lies in a large area in the field of view, and a small value E indicates that the partial region of the body lies in a small area in the field of view. Considering the structure of the human body, the entropy is large when the human body is viewed from the front or rear, and is small when the human body is viewed from the side.

Thus, the angle that provides small entropy E representing the visibility of the human body may be obtained and set as the angle by which the position B' is rotated about the vertical vector passing through the part A of the user in accordance with the visibility of the human body. More specifically, the position B' is gradually rotated about the vertical vector passing through the part A of the user until the entropy E representing the visibility of the human body is minimized. The posture recognition result received from the posture recognition unit 102 indicates the positions of the body parts. Thus, the two dimensional area of a triangle defined by the positions of the three connected parts viewed from the position B' may be set as the two dimensional area of the partial area of the human body in the field of view.

The angle of the rotation of the position B' about the vertical vector passing through the part A of the user is set based on the entropy E, and thus the visualized posture has the same visibility regardless of the angle of the standing user relative to the space display unit 105.

The visibility of the human body may be calculated in a method different from that described above such as those discussed in Pere-Pau Vazquez, Miguel Feixas, Mateu Sbert, Wolfgang Heidrich: Automatic View Selection Using Viewpoint Entropy and its Application to Image-Based Modelling. Computer Graphics Forum, Volume 22, Issue 4, pages 689-700, December 2003 and Peter M. Hall, Martin Owen: Simple Canonical Views. BMVC 2005.

Figure 7:
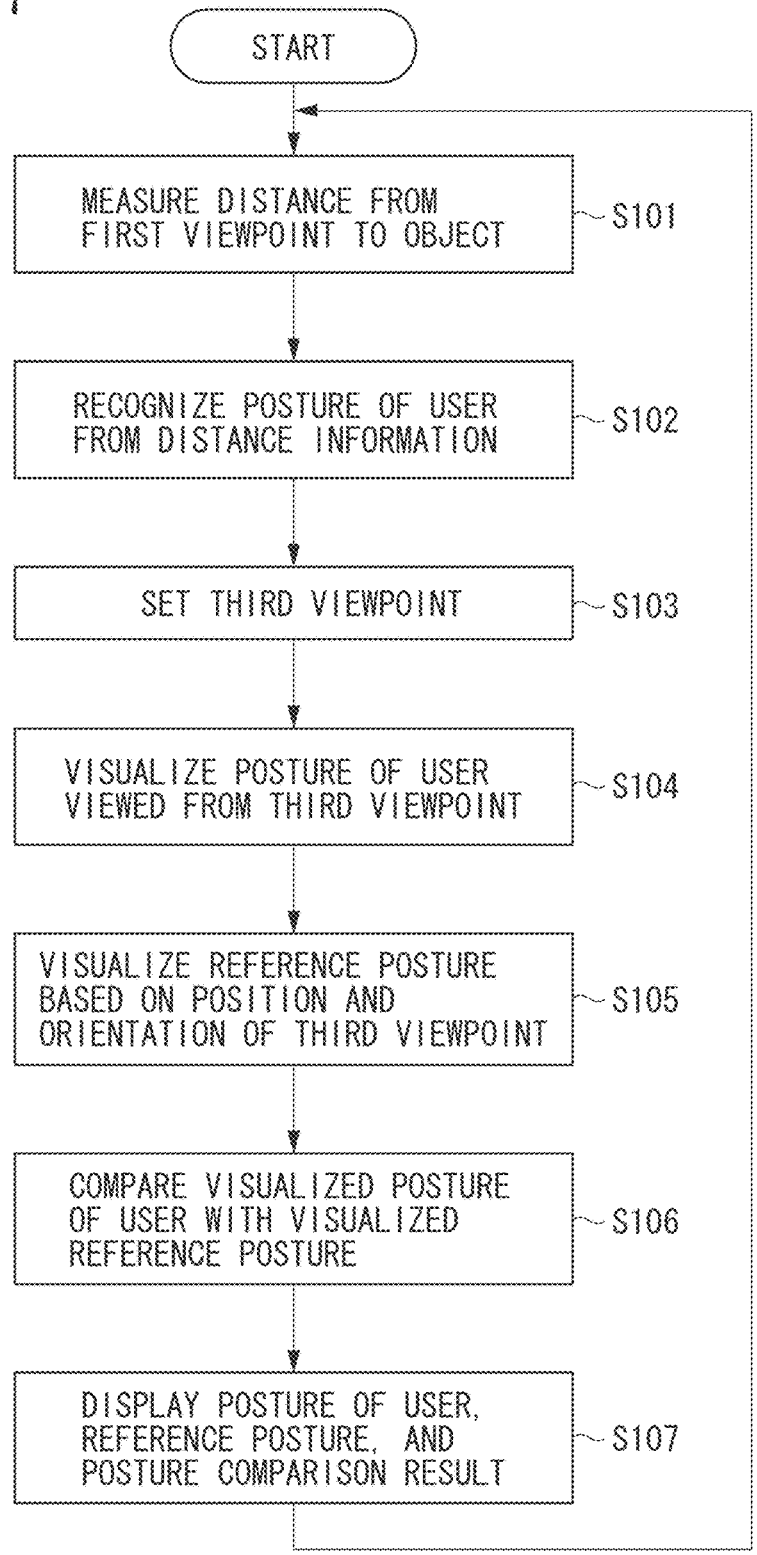
FIG. 7 is a flowchart illustrating processing performed by the posture visualization apparatus according to the first exemplary embodiment of the present invention.

Now, the processing performed by the posture visualization apparatus 100 according to the first exemplary embodiment of the present invention will be described with reference to FIG. 7. The processing in FIG. 7 starts when the user stands in front of the space display unit 105 and turns on the posture visualization apparatus 100. The processing illustrated in FIG. 7 is executed when the CPU in the posture visualization apparatus according to the present exemplary embodiment reads and executes required data and a program in a recording medium such as a read only memory (ROM).

In step S101, the image capture unit 101 measures a distance from the first viewpoint to an object in the field of view. Then, the image capture unit 101 outputs the measurement result to the posture recognition unit 102 as the distance information.

In step S102, the posture recognition unit 102 three dimensionally recognizes the posture of the user from the human body shape in the distance information received from the posture recognition unit 102. The posture recognition result is output to the posture visualization viewpoint setting unit 103 and the posture visualization unit 104.

In step S103, the posture visualization viewpoint setting unit 103 sets the position and orientation of the viewpoint (third viewpoint) from which the posture to be displayed to the user is viewed. The position and orientation of the third viewpoint are output to the posture visualization unit 104 and the reference posture visualization unit 107.

In step S104, the posture visualization unit 104 visualizes the mirror image of the posture of the user viewed from the third viewpoint received from the posture visualization viewpoint setting unit 103 based on the posture recognition result received from the posture recognition unit 102. The visualization result is output to the space display unit 105 and the posture comparison unit 108.

In step S105, the reference posture visualization unit 107 visualizes the mirror image of the reference posture indicated by the posture data stored in the reference posture storage unit 106, based on the position and orientation of the third viewpoint received from the posture visualization viewpoint setting unit 103. The reference posture visualization unit 107 outputs the visualization result to the space display unit 105 and the posture comparison unit 108. Step S104 and step S105 may be executed in the order opposite to that described above, or may be simultaneously executed.

In step S106, the posture comparison unit 108 compares the mirror image of the posture of the user visualized by the posture visualization unit 104 with the mirror image of the reference posture visualized by the reference posture visualization unit 107. Thus, the posture comparison unit 108 calculates the difference between the postures expressed as a text, a graph, a diagram, and the like to be output to the space display unit 105 as the posture comparison result.

In step S107, the space display unit 105 displays to the user, the mirror image of the real space viewed from the mirror image position of the user viewpoint (the second viewpoint), and the visualization result of the mirror image of the posture of the user viewed from the third viewpoint received from the posture visualization unit 104. The space display unit 105 further displays the visualization result of the reference posture received from the reference posture visualization unit 107 and the posture comparison result received from the posture comparison unit 108. Then, the processing returns to step S101 and is repeated until the user stops using the posture visualization apparatus 100.

Through the processing described above, the posture visualization apparatus 100 can display at once to the user, a mirror image in the half mirror from which leftward or rightward leaning of the posture can be seen and checked, and the visualization result of the mirror image of the posture viewed from the viewpoint that allows the forward or backward leaning of the posture that is difficult to check from the mirror image to be clearly seen. Thus, the user can see check whether the person is standing straight or leaning leftward, rightward, forward, or backward at a glance. Furthermore, the visualization result of the mirror image of the reference posture and the result of comparison between the current posture and the reference posture are further displayed. Thus, the user can more firmly recognize the difference between the current posture and the reference posture.

The image capture unit 101 disposed above the space display unit 105 in the present exemplary embodiment may be disposed in any other places such as below or beside the space display unit 105. As a modification of the present exemplary embodiment, the space display unit 105 is formed by disposing the display beside the half mirror instead of behind the half mirror. As an alternative exemplary embodiment, a visualization result of a non-mirror image may be displayed unlike in the present exemplary embodiment in which the visualization result of the mirror image is displayed.

The image capture unit 101 according to the first exemplary embodiment is the distance measurement camera disposed above the space display unit 105 to which the user faces forward. The posture visualization apparatus 100 according to the first exemplary embodiment includes the posture visualization viewpoint setting unit 103 and the posture visualization unit 104. Thus, the visualization result of the posture as viewed from the third viewpoint different from the imaging viewpoint of the image capture unit 101 can be displayed to the user. The visualization result is displayed together with the mirror image of the user reflected in the half mirror as a part of the space display unit 105. Thus, the user can see and check whether the user is standing straight or leaning leftward, rightward, forward, or backward at a glance. Therefore, in the first exemplary embodiment, the posture viewed from the front and the posture viewed from any other direction other than the front can be displayed to the user simply by disposing a system including the distance measurement camera in front of the user.

Next, a second exemplary embodiment of the present invention will be described. A posture visualization apparatus according to the second exemplary embodiment is installed in a golf practice range and the like, and is used by a golfer who comes to the golf practice range and checks the golfer's golf swing form. The posture visualization apparatus according to the second exemplary embodiment visualizes the posture of the user showing the golfer's golf swing to the apparatus viewed in any two directions and displays the result to the user.

Figure 8:
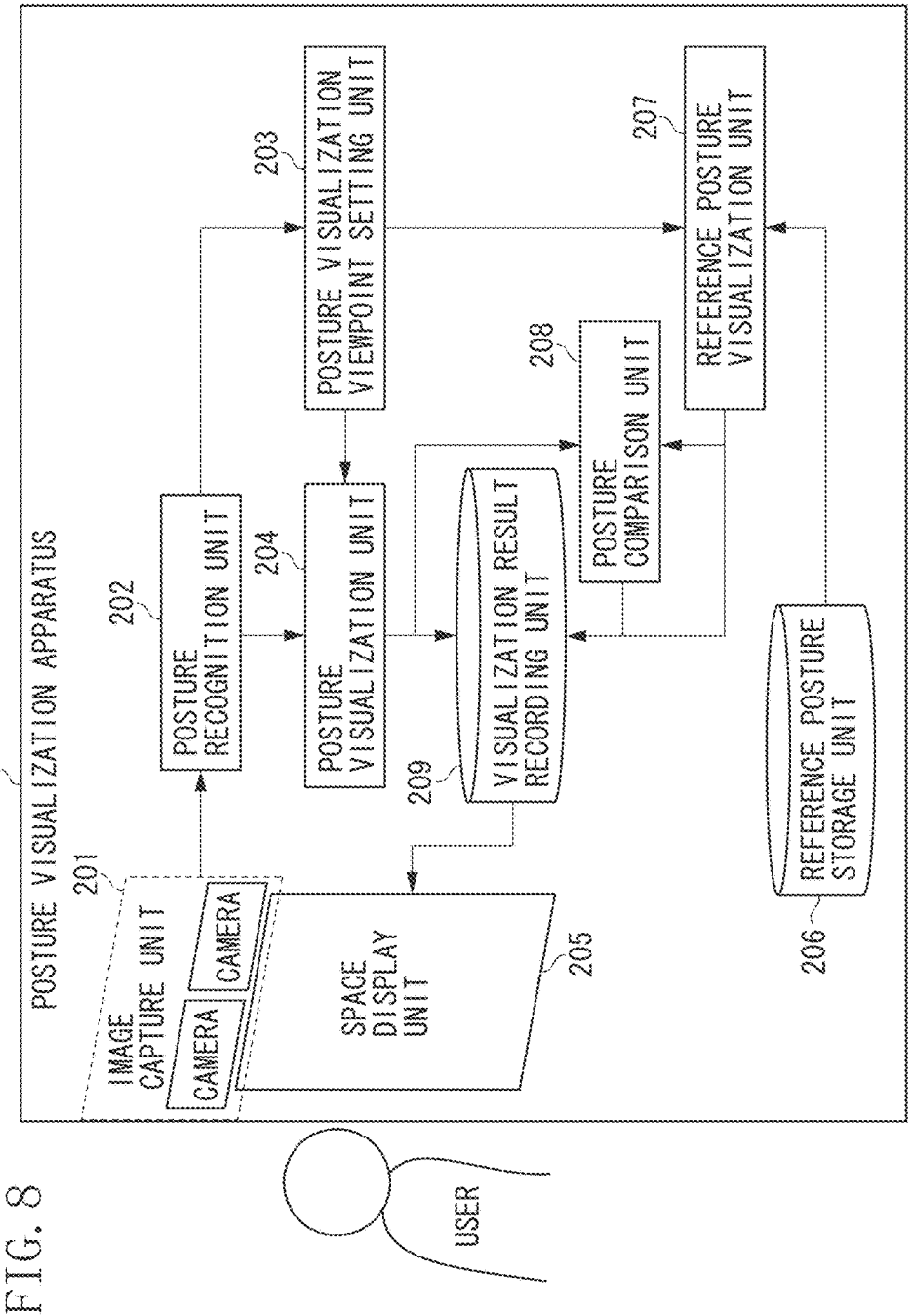
FIG. 8 is a block diagram illustrating a configuration of a posture visualization apparatus according to a second exemplary embodiment of the present invention.

FIG. 8 is a block diagram illustrating a configuration of a posture visualization apparatus 200 according the second exemplary embodiment. As illustrated in FIG. 8, the posture visualization apparatus 200 includes an image capture unit 201, a posture recognition unit 202, a posture visualization viewpoint setting unit 203, a posture visualization unit 204, a space display unit 205, a reference posture storage unit 206, a reference posture visualization unit 207, a posture comparison unit 208, and a visualization result recording unit 209. The posture recognition unit 202, the posture visualization viewpoint setting unit 203, the posture visualization unit 204, the reference posture visualization unit 207, and the posture comparison unit 208 are functional configurations implemented when a CPU in the posture visualization apparatus 200 reads and executes required data and a program stored in a recording medium such as an HDD. The reference posture storage unit 206 and the visualization result recording unit 209 serve as a partial storage area in the recording medium such as the HDD.

The image capture unit 201 includes a plurality of cameras. Each of the cameras of the image capture unit 201 may be a general camera that captures visible image data, or a camera that measures the distance from the position of the imaging viewpoint of the camera to an object in the field of view, and outputs the result as distance information. The distance information includes, for example, distance image data obtained by converting the measured distance values into pixel values. Both types of camera may be mixedly used, or a plurality of cameras of one of the types may be used. In the second exemplary embodiment, a plurality of imaging viewpoints of the cameras of the image capture unit 201 are collectively referred to as the first viewpoint.

The cameras of the image capture unit 201 are positioned in such a manner that an imaging area is set in front of the space display unit 205 described below. For example, the cameras are disposed to surround a space in front of the space display unit 205 from various directions. Thus, when the user of the posture visualization apparatus 200 stands in front of the space display unit 205, the user's human body is imaged by the cameras of the image capture unit 201. The image capture unit 201 may include any number of cameras larger than one. Image data captured by each of the cameras of the image capture unit 201 is output to the posture recognition unit 202.

The posture recognition unit 202 receives the image data pieces from the image capture unit 201, and three dimensionally recognizes a human body shape of the user from the image data pieces. As a method for acquiring a three dimensional shape of the body in a plurality of image data pieces performed by the posture recognition unit 202, for example, the following method is known that is discussed in Richard A. Newcombe, Shahram Izadi, Otmar Hilliges, David Molyneaux, David Kim, Andrew J. Davison, Pushmeet Kohli, Jamie Shotton, Steve Hodges, and Andrew Fitzgibbon, KinectFusion: Real-Time Dense Surface Mapping and Tracking, in IEEE ISMAR, IEEE, October 2011.

Specifically, the posture recognition unit 202 first performs a background difference method and the like to extract a human body area from the image data pieces. If the image data is visible image data, a range of the space where the human figure can exist is limited inside a cone defined with the camera lens center as the apex and the object region as the section. If the image data is the distance image data, the range in the space where the human figure can exist is limited on the farther side in a 2.5 dimensional map as viewed from the imaging viewpoint. The posture recognition unit 202 acquires a three dimensional shape of a human body by integrating spaces in which a human body area can exist extracted from the image data pieces captured by the cameras of the image capture unit 201. The posture recognition unit 202 outputs a three dimensional shape of the human body as the posture recognition result to the posture visualization viewpoint setting unit 203 and the posture visualization unit 204.

The posture visualization viewpoint setting unit 203 sets two sets of a position and an orientation of viewpoints from which a posture displayed to the user is viewed. The positions and orientations set herein are positions and orientations relative to the three dimensional shape of the user received from the posture recognition unit 202, and are different from those of the imaging viewpoints (first viewpoint) of the cameras of the image capture unit 201 to the user. Thus, the posture visualization viewpoint setting unit 203 sets the second and the third viewpoint different from the first viewpoint in the position and orientation, as viewpoints from which a posture displayed to the user is viewed. How the posture visualization viewpoint setting unit 203 sets the third viewpoint different from the first and the second viewpoints will be described below. The positions and orientations of the second and the third viewpoints set by the posture visualization viewpoint setting unit 203 are output to the posture visualization unit 204 and the reference posture visualization unit 207.

The posture visualization unit 204 visualizes the posture displayed to the user so that the user can see and check the posture. More specifically, the posture visualization unit 204 disposes the three dimensional shape of the human body as the posture recognition result received from the posture recognition unit 202 on a three dimensional virtual space. Then, the posture visualization unit 204 forms the three dimensional virtual space viewed from the second viewpoint received from the posture visualization viewpoint setting unit 203. Next, the posture visualization unit 204 visualizes the three dimensional shape of the human body viewed from the third viewpoint received from the posture visualization viewpoint setting unit 203. Then, the posture visualization unit 204 superimposes the three dimensional shape of the human body visualized based on the third viewpoint to have an appropriate size at an appropriate position of the three dimensional virtual space viewed from the second viewpoint The resultant data is the posture visualization result of the posture visualization unit 204.

Figure 9:
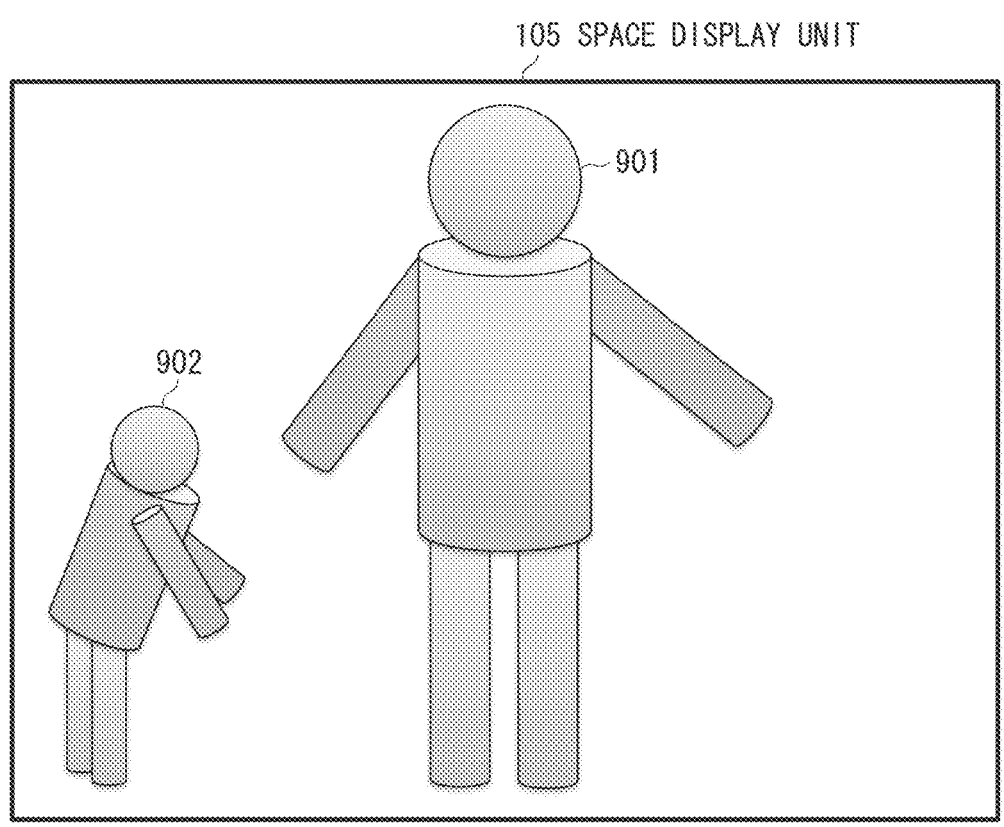
FIG. 9 is a diagram illustrating a visualization result of a posture visualization unit in the second exemplary embodiment of the present invention.

FIG. 9 is a diagram illustrating an example of the visualization result of the posture visualization unit 204 according to the second exemplary embodiment. A three dimensional shape 901 of the human body viewed from the second viewpoint is illustrated in the center of FIG. 9. A small objet illustrated beside the three dimensional shape 901 is a three dimensional shape 902 viewed from the third viewpoint. As illustrated in FIG. 9, two three dimensional shapes of the same human body viewed from different viewpoints are displayed. The visualization result is output to the posture comparison unit 208 and the visualization result recording unit 209.

The reference posture storage unit 206 stores therein posture data representing a reference posture of a golf swing. The reference posture is, for example, a posture of a professional golfer performing the golf swing, or may be a posture of the user performing the golf swing in the past. The posture data is equivalent to the posture recognition result output from the posture recognition unit 202. That is, the three dimensional shape of the human body is stored in the reference posture storage unit 206 as the posture data. The reference posture visualization unit 207 refers to the posture data stored in the reference posture storage unit 206.

The reference posture visualization unit 207 visualizes the reference posture to be displayed to the user so that the user can see and check the reference posture. More specifically, the reference posture visualization unit 207 visualizes posture data stored in the reference posture storage unit 206 based on the position and orientation of the third viewpoint received from the posture visualization viewpoint setting unit 203. The visualized posture is a posture of the user taking the reference position viewed from the third viewpoint, and is output to the visualization result recording unit 209 and the posture comparison unit 208 as visualization result.

The posture comparison unit 208 compares the posture of the user visualized by the posture visualization unit 204 with the reference posture visualized by the reference posture visualization unit 207. Thus, the posture comparison unit 208 calculates the difference between the postures. Specifically, the posture comparison unit 208 calculates a difference between the postures in an angle of a hip joint or an angle of a knee joint. For example, the angle of the hip joint is an angle between a vector between the right shoulder and the right part of hip and a vector between the right part of hip and the right knee. For example, the angle of the knee joint is an angle between a vector between the right part of hip and the right knee and a vector between the right knee and the right ankle. Alternatively, the difference in the time required for a posture to change to the other posture, or a moving path of a body part during the change may be calculated. The difference between the postures is expressed as a text, a graph, a diagram, or the like and is output to the visualization result recording unit 209.

The visualization result recording unit 209 records the three dimensional virtual space received from the posture visualization unit 204. The three dimensional virtual spaces received from the posture visualization unit 204 may each be recorded as independent image data, or chronologically combined into video data to be recorded. The space display unit 205 refers to the three dimensional virtual space thus recorded. The visualization result recording unit 209 also records the visualization result of the reference posture received from the reference posture visualization unit 207 and the posture comparison result received from the posture comparison unit 208.

The space display unit 205 is what is called a display and displays the image data of the three dimensional virtual space recorded in the visualization result recording unit 209. As described above, one of the sets of the position and orientation of the two viewpoints set by the posture visualization viewpoint setting unit 203 is set as those of the "second viewpoint". The three dimensional virtual space viewed from the second viewpoint is displayed on the space display unit 205. The three dimensional shape of the human body acquired by the posture recognition unit 202 is viewed from the second viewpoint. The three dimensional shape of the human body visualized based on the third viewpoint is superimposed on the three dimensional virtual space to be displayed as described above. Thus, the user standing in front of the space display unit 205 can see at once the three dimensional virtual space including the three dimensional shape of the user's human body as the posture viewed from the second viewpoint and the three dimensional shape of the user's human body as the posture viewed from the third viewpoint. The space display unit 205 may flip the three dimensional space left side right so as to display the mirror image of the space.

The image data pieces recorded in the visualization result recording unit 209 may be chronologically combined in the order of the recording to be displayed on the space display unit 205 as video data, or any image data may be displayed for a predetermined time period. The visualization result recording unit 209 also records the visualization result of the reference posture received from the reference posture visualization unit 207 and the posture comparison result received from the posture comparison unit 208. The space display unit 205 may superimpose the visualization result of the reference posture and the posture comparison result on the three dimensional virtual space to be displayed.

Now, how the posture visualization viewpoint setting unit 203 sets the third viewpoint different from the first and the second viewpoints will be described. The second viewpoint is set to have any appropriate position and orientation different from those of the first viewpoint. The second viewpoint may be set to have the position and orientation that allows the user to have a clear look of the posture of the three dimensional shape of the human body of a user performing the golf swing considering the nature of this exemplary embodiment. For example, the position and orientation of the second viewpoint may be set as follows. Specifically, the "entropy E representing the visibility" used in the description of the first exemplary embodiment is calculated at all the viewpoint positions oriented toward the center of gravity of the three dimensional shape of the body as points on a sphere having a predetermined radius R with the center of gravity of the three dimensional shape of the human body as the center. Then, the position and orientation of the second viewpoint may be obtained as those that provide the largest entropy E. Considering the nature of the human body shape, the entropy E is at the maximum value when the second viewpoint has the position and orientation to see the human figure shape from the front (or back). It is a matter of course that the second viewpoint can be set through a method different from the one described above.

The third viewpoint is set to have a position and an orientation that allow a user to get a better look of a posture that is difficult to check from the second viewpoint. For example, the third viewpoint may be a point on the sphere having a predetermined radius R with the center of gravity of the three dimensional shape of the human body as the center like the second viewpoint, at one of positions to have the orientation orthogonal to that of the second viewpoint, and at a viewpoint position oriented toward the center of gravity. Under the condition that the third viewpoint is at the same height as the second viewpoint if the second viewpoint is at the position from which the three dimensional shape of the human body is viewed from the front, the third viewpoint is positioned to view the three dimensional shape from the side. It is a matter of course that the third viewpoint can be set through a method different from the one described above.

How the second and the third viewpoints are set may be changed in accordance with the posture recognition result of the posture recognition unit 202. For example, when the posture recognition result of the posture recognition unit 202 indicates the posture before the golf swing, the second viewpoint may be set to have the position and orientation that do not maximize but minimize the entropy E indicating the visibility. Then, the second viewpoint may be set to have the position and orientation that maximize the entropy E indicating the visibility when the posture recognition result of the posture recognition unit 202 indicates the posture after the golf swing is started. For example, the posture visualization viewpoint setting unit 203 may set the position and orientation of the second viewpoint to those that minimize the entropy E indicating the visibility while the posture recognition result received from the posture recognition unit 202 remains unchanged. Then, the posture visualization viewpoint setting unit 203 may set the position and orientation of the second viewpoint to those that maximizes the entropy E indicating the visibility when the posture recognition result currently received from the posture recognition unit 202 is different from the previously received result.

How the second and the third viewpoints are set may be changed in accordance with the type of the exercise of the user. For example, the position and orientation of the second viewpoint may be set to those that maximizes the entropy E indicating the visibility when the user performs the golf swing, and to those that minimize the entropy E indicating the visibility when the user performs a hip hop dance. Here, whether the user performs the golf swing or the hip hop dance is performed is determined based on the posture recognition result received from the posture recognition unit 202. Thus, the reference posture storage unit 206 stores therein posture data before the golf swing starts and posture data before the hip hop dance starts as the reference postures in advance. The posture visualization viewpoint setting unit 203 calculates the difference between the posture recognition result received from the posture recognition unit 202 and each posture data, and determines that the exercise corresponding to the posture data with the smaller difference is performed.

Figure 10:
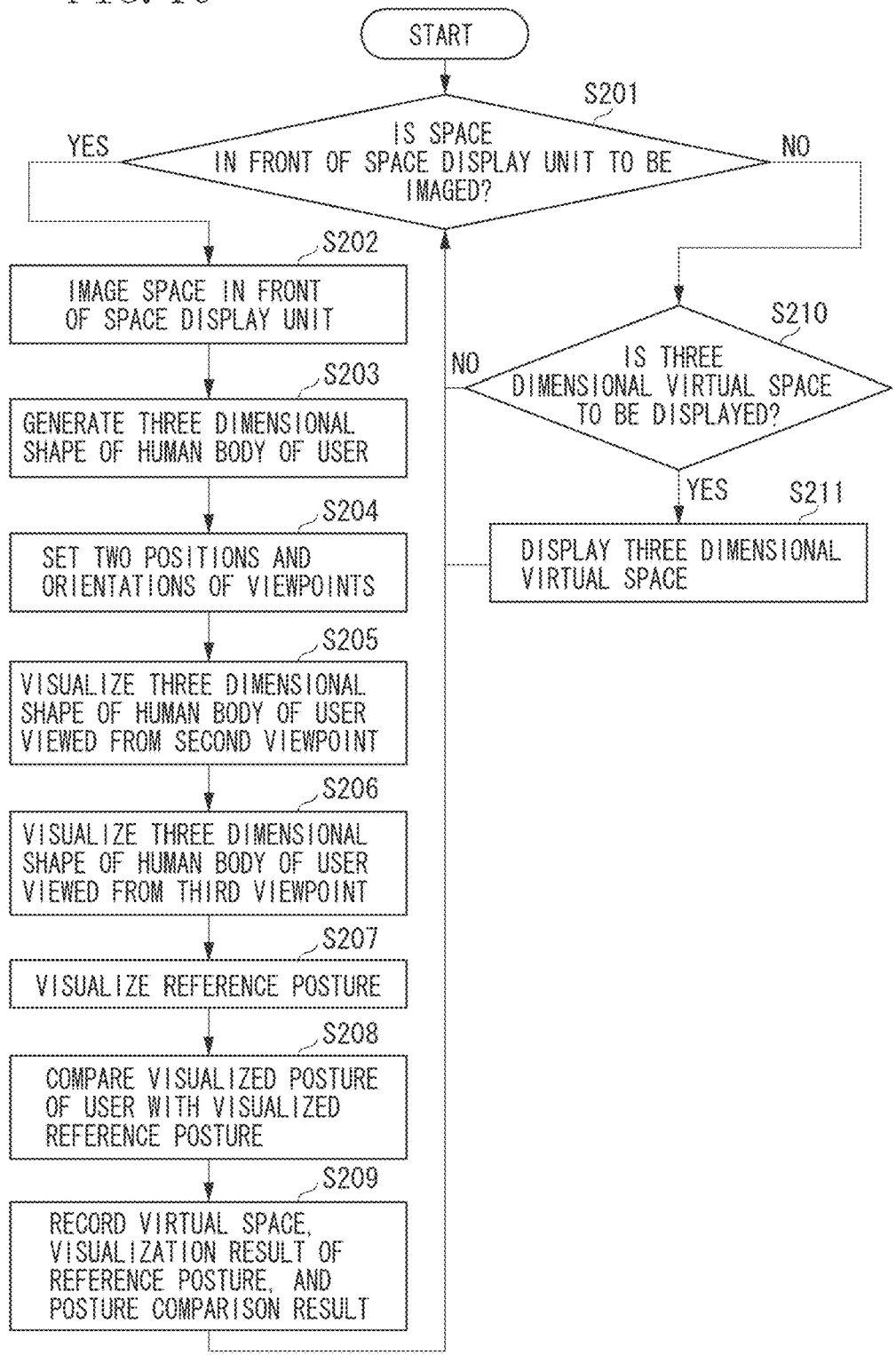
FIG. 10 is a flowchart illustrating processing performed by the posture visualization apparatus according to the second exemplary embodiment of the present invention.

Now, the processing performed by the posture visualization apparatus 200 according to the second exemplary embodiment of the present invention will be described with reference to FIG. 10. The processing illustrated in FIG. 10 starts when the user stands in front of the space display unit 205 and turns on the posture visualization apparatus 200. The processing illustrated in FIG. 10 is executed when the CPU in the posture visualization apparatus according to the present exemplary embodiment reads and executes required data and a program in a recording medium such as a ROM.

In step S201, the posture visualization apparatus 200 determines whether a setting in which the space in front of the space display unit 205 is imaged with the cameras of the image capture unit 201 has been made. If the setting in which the space in front of the space display unit 205 is imaged has been made by a setting unit (not illustrated) (YES in step S201), the processing proceeds to step S202. If the setting in which the space in front of the space display unit 205 is imaged has not been made (NO in step S201), the processing proceeds to step S210.

In step S202, the cameras of the image capture unit 201 images the space in front of the space display unit 205. A plurality of pieces of image data thus captured is output to the posture recognition unit 202. In step S203, the posture recognition unit 202 three dimensionally generates the human body shape of the user from the image data pieces received from the image capture unit 201. The three dimensional shape of the human body generated by the posture recognition unit 202 is output to the posture visualization viewpoint setting unit 203 and the posture visualization unit 204.

In step S204, the posture visualization viewpoint setting unit 203 sets the two sets of position and orientation of viewpoints from which the posture displayed to the user is viewed. The two viewpoints are the second and the third viewpoints different from the imaging viewpoints (first viewpoint) of the cameras of the image capture unit 201 to the user. The positions and orientations of the second and the third viewpoints set by the posture visualization viewpoint setting unit 203 are output to the posture visualization unit 204.

In step S205, the posture visualization unit 204 disposes the three dimensional shape of the human body as the posture recognition result received from the posture recognition unit 202 in a three dimensional virtual space. Then, the posture visualization unit 204 visualizes the three dimensional shape of the human body viewed from the second viewpoint received from the posture visualization viewpoint setting unit 203.

In step S206, the posture visualization unit 204 visualizes the three dimensional shape of the human body received from the posture recognition unit 202 when viewed from the third viewpoint received from the posture visualization viewpoint setting unit 203. Then, the posture visualization unit 204 superimposes the three dimensional shape of the human body visualized based on the third viewpoint to have an appropriate size at an appropriate position of the three dimensional virtual space viewed from the second viewpoint. For example, the posture visualization unit 204 randomly disposes an area for displaying "posture viewed from the third viewpoint" of which the size and the shape are determined in advance (e.g., vertically long rectangular area) on the three dimensional virtual space. Then, the posture visualization unit 204 determines whether the region for displaying "posture viewed from the third viewpoint" overlaps the area where the three dimensional shape of the body viewed from the second viewpoint that has been provided on the three dimensional virtual space. If the areas do not overlap, the posture visualization unit 204 provides the three dimensional shape of the body visualized based on the third viewpoint in the determined area for displaying "posture viewed from the third viewpoint". If the areas overlap, the posture visualization unit 204 repeats the operation of randomly disposing the area for displaying "posture viewed from the third viewpoint" on the three dimensional virtual space, until the area for displaying "posture viewed from the third viewpoint" no longer overlap the area where the three dimensional shape of the human body is provided. If the area for displaying "posture viewed from the third viewpoint" keeps overlapping the area where three dimensional shape of the human body viewed from the second viewpoint is provided even after repeating the operation for a predetermined number of times, the posture visualization unit 204 downsizes the area for displaying "posture viewed from the third viewpoint" and then disposes the area again. The posture visualization unit 204 repeats the operations until the position and the size of the region for displaying "posture viewed from the third viewpoint" are determined, and thus forms the three dimensional shape of the human body visualized in the area for displaying "posture viewed from the third viewpoint" thus determined. The posture visualization unit 204 outputs thus formed three dimensional virtual space to the visualization result recording unit 209. Step s205 and step S206 may be executed in the order opposite to that described above, or may be simultaneously executed.

In step S207, the reference posture visualization unit 207 visualizes the reference posture stored in the reference posture storage unit 206, based on the position and orientation of the third viewpoint received from the posture visualization viewpoint setting unit 203. The reference posture visualization unit 207 outputs the visualization result to the visualization result storage unit 209 and the posture comparison unit 208.

In step S208, the posture comparison unit 208 compares the posture of the user visualized by the posture visualization unit 204 with the reference posture visualized by the reference posture visualization unit 207. Thus, the posture comparison unit 208 calculates the difference between the postures expressed as a text, a graph, a diagram, and the like to be output to the visualization result recording unit 209 as the posture comparison result.

In step S209, the visualization result recording unit 209 records the three dimensional virtual space received from the posture visualization unit 204, the visualization result of the reference posture received from the reference posture visualization unit 207, and the comparison result received from the posture comparison unit 208.

In step S210, the posture visualization apparatus 200 determines whether a setting in which the space display unit 205 displays the three dimensional virtual space has been made. If the setting in which the space display unit 205 displays the three dimensional virtual space has been made by a setting unit not illustrated in FIG. 8 (YES in step S210), the processing proceeds to step S211. If the setting in which the space display unit 205 displays the three dimensional virtual space has not been made (NO in step S210), the processing returns to step S201.

In step S211, the space display unit 205 displays the three dimensional virtual space recorded in the visualization result recording unit 209 or the mirror image of the space. The three dimensional virtual space or the mirror image of the space may be the latest image data recorded in the visualization result recording unit 209, or may be image data obtained in the past. The visualization result and the posture comparison result are superimposed on the image data to be displayed. Then, the processing returns to step S201 and is repeated until the user stops using the posture visualization apparatus 200.

Figure 11:
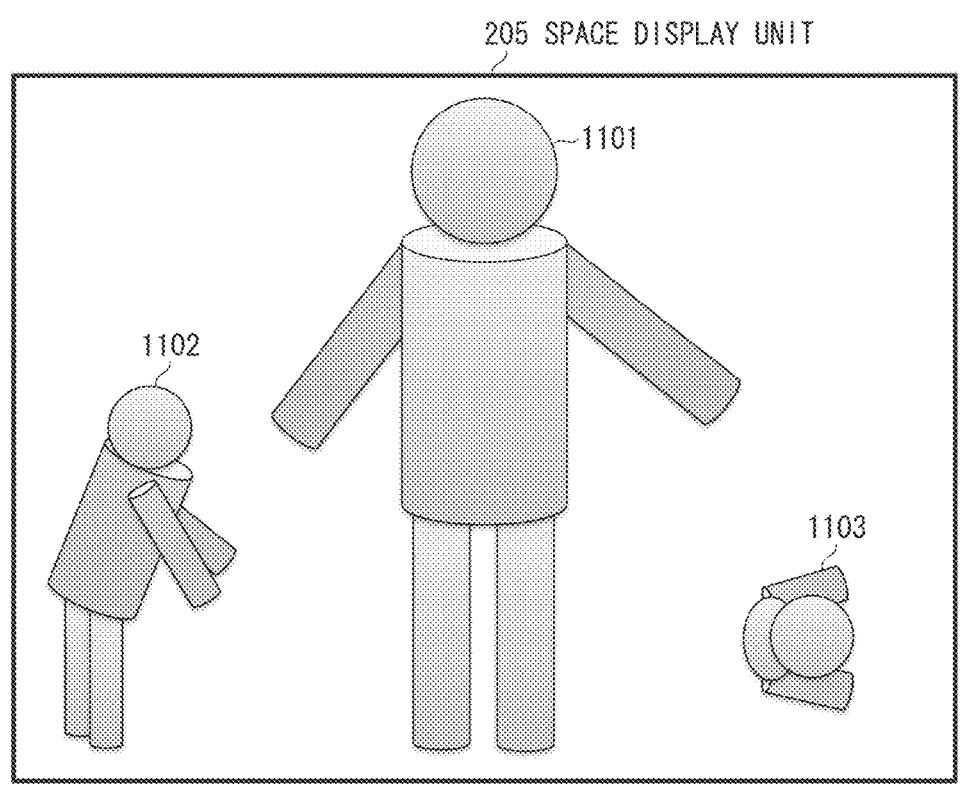
FIG. 11 is a diagram illustrating an example in which a three dimensional shape of a human body of a user viewed in three directions is displayed as front, side, and top views.

Through the processing described above, the posture visualization apparatus 200 displays the three dimensional shapes 901 and 902 of the human body of the user viewed from two directions to the user as illustrated in FIG. 9. As illustrated in FIG. 11, the three dimensional shapes of the human body of the user viewed from three directions as a front view 1101, a side view 1102, and a top view 1103 may be displayed. Alternatively, the three dimensional shapes of the human body of the user viewed from four or more directions may be provided. Here, the posture visualization viewpoint setting unit 203 further sets additional viewpoints such as fourth and fifth viewpoints, and the posture visualization unit 204 visualizes the three dimensional shape of the body for each of the additionally set viewpoints.

For example, in the processing described above, a setting is made in which while the user is performing the golf swing, the cameras of the image capture unit 201 capture an image of the space in front of the space display unit 205, and the space display unit 205 does not display the three dimensional virtual space. Then, after the user finishes the golf swing, the cameras of the image capture unit 201 do not capture the image of the space in front of the space display unit 205, and the space display unit 205 displays the three dimensional virtual space. Thus, the user that has finished performing the golf swing can see the user's posture (three dimensional shape of the body) performing the golf swing in a video of the posture viewed from two different viewpoints.

Alternatively, for example, in the processing described above, a setting is made in which while the user is performing the golf swing, the cameras of the image capture unit 201 capture an image of the space in front of the space display unit 205, and the space display unit 205 does not display the three dimensional virtual space. Thus, the user can see the user's posture (three dimensional shape of the body) performing the golf swing in a video of the posture viewed from two different viewpoints while performing the golf swing.

The user can see the user's posture viewed from the front and the side at once by using the posture visualization apparatus 200, for example, and thus can check the deviation and twisting of the body in the posture viewed from the front and the deviation and twisting of the body and arms in the posture viewed from the side at a glance.

The posture visualization apparatus 200 according to the second exemplary embodiment allows the user to see the user's figure represented in the three dimensional virtual space from two viewpoints at once. The two viewpoints are not independent from one another. Specifically, the posture visualization viewpoint setting unit 203 sets the position and orientation that allow the user to obtain a good look of the posture that is difficult to check from one viewpoint (second viewpoint) as those of the other viewpoint (third viewpoint). The posture visualization apparatus 200 of the present exemplary embodiment differs from a generally known system that displays three dimensional virtual spaces viewed from a plurality of viewpoints in this point.

According to the second exemplary embodiment, the user can see the user's figure represented in the virtual space from two viewpoints at once. The two viewpoints are different from the imaging viewpoints of the cameras of the image capture unit 201 that directly image the user. Thus, an advantageous effect is provided that the posture of the user viewed from any two viewpoints can be visualized regardless of the physical arrangement of the system as a whole. The two viewpoints are not independent from one another and the posture visualization viewpoint setting unit 203 sets one of the viewpoints (third viewpoint) to have a position and an orientation at which a posture of the user that is difficult to check from the other one of the viewpoints (second viewpoint) can be more clearly seen. Thus, an advantageous effect is provided that two postures by which three dimensional leaning of a posture and the like can be visually checked easily can be displayed to the user at once. Thus, the second exemplary embodiment provides a system in which components can be freely arranged in accordance with constraints of an installed location. Thus, the posture viewed in two directions that allow a user to easily see and check three dimensional leaning of a posture and the like can be displayed to the user.

Now, a third exemplary embodiment of the present invention will be described. A posture visualization apparatus according to the third exemplary embodiment is installed in a clothing store or beside a closet of a user's home. The posture visualization apparatus is used when trying on a cloth sold in the closing store, and used when choosing an outfit in a user's home. The posture visualization apparatus according to the third exemplary embodiment visualizes a forward leaning level of a posture of a user facing forward to the apparatus to look at the user and displays the visualization result to the user together with the posture of the user viewed from the front.

Figure 12:
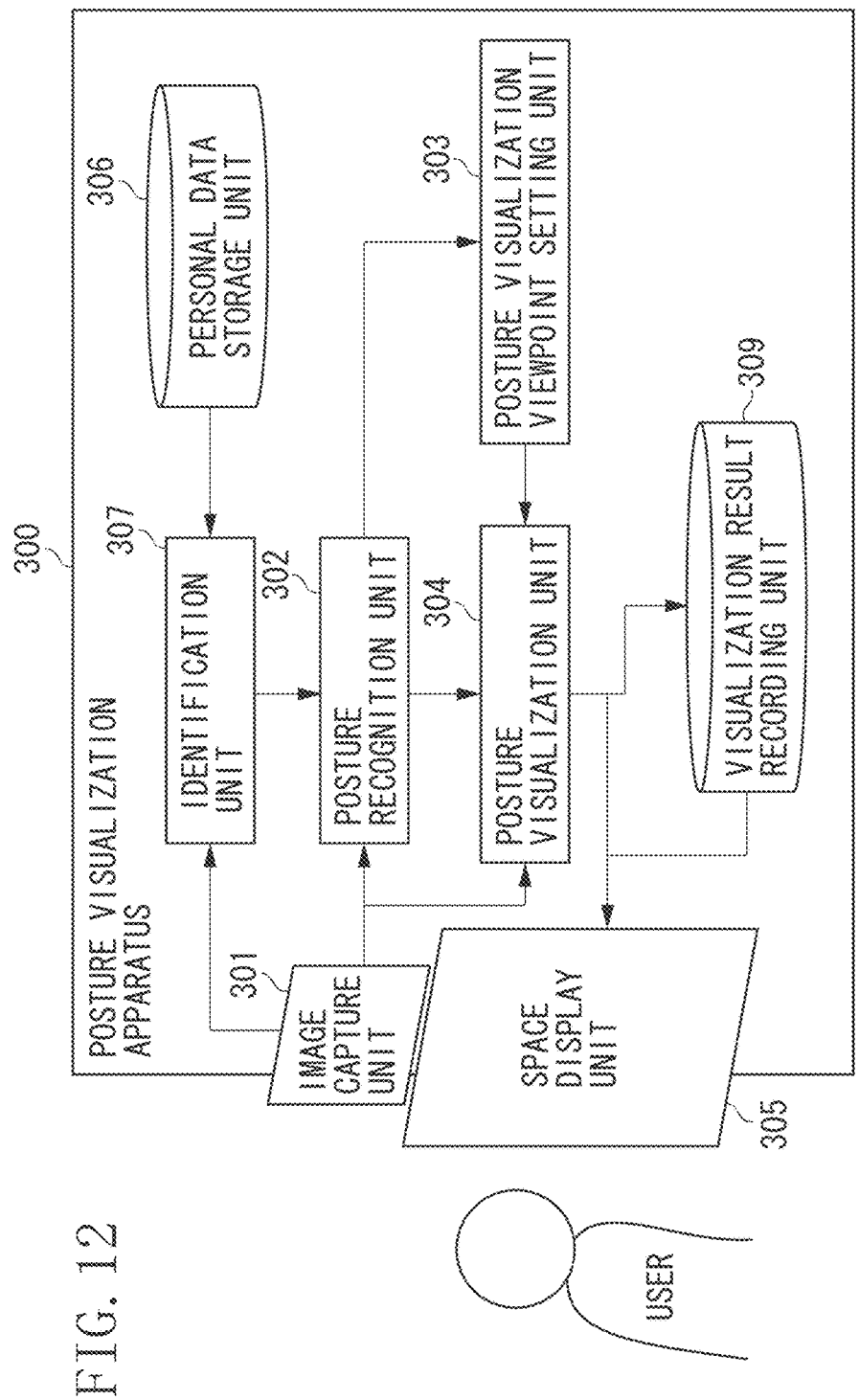
FIG. 12 is a block diagram illustrating a configuration of a posture visualization apparatus according to a third exemplary embodiment of the present invention.

FIG. 12 is a block diagram illustrating a configuration of a posture visualization apparatus 300 according to the third exemplary embodiment. As illustrated in FIG. 12, the posture visualization apparatus 300 includes an image capture unit 301, a posture recognition unit 302, a posture visualization viewpoint setting unit 303, a posture visualization unit 304, a space display unit 305, a personal data storage unit 306, an identification unit 307, and a visualization result recording unit 309. The posture recognition unit 302, the posture visualization viewpoint setting unit 303, the posture visualization unit 304, and the identification unit 307 are functional configurations implemented when a CPU in the posture visualization apparatus 300 reads and executes required data and a program in a recording medium such as an HDD. The personal data storage unit 306 and the visualization result recording unit 309 serve as a partial storage area in the recording medium such as the HDD.

The image capture unit 301 is a general camera that captures visible image data, and is positioned to capture an image of a front side of the space display unit 305 described below. For example, the image capture unit 301 is disposed above the space display unit 305 while facing diagonally downwards. Thus, the image capture unit 301 captures an image of a figure of the user of the posture visualization apparatus 300 standing in front of the space display unit 305. In the present exemplary embodiment, the first viewpoint is the imaging viewpoint of the camera of the image capture unit 301. The image capture unit 301 outputs the captured image data to the identification unit 307, the posture recognition unit 302, and the posture visualization unit 304.

The identification unit 307 receives the captured image data from the image capture unit 301 and identifies the user in the captured image data. The user may be identified with a general method. For example, a face area is detected in the captured image data, a similarity between the face area and face image data linked to a person stored in advance, and the person linked to the face image data with the highest similarity may be obtained as the identification result. The face area may be detected and the similarity between image data pieces may be calculated through general methods. The face image data linked to a person is stored in the personal data storage unit 306 described below.

The identification unit 307 refers to human body data linked to the identified person in the personal data storage unit 306. The human body data is, for example, height data of the person, for example. Alternatively, the human body data may be any other data related to a physical size of a human body such as chest measurement data and leg length data. The identification unit 307 outputs the referred human body data to the posture recognition unit 302.

The personal data storage unit 306 stores therein personal data that is referred to by the identification unit 307. One personal data piece is data used for the identification by the identification unit 307. Such data includes the face image data linked to a person, and other data such as fingerprint data and voice print data linked to a person.

The personal data storage unit 306 stores therein human body data linked to a person and output from the identification unit 307 to the posture recognition unit 302 as another piece of personal information. The human body data is data related to a physical size of a human body such as height data, chest measurement data, and face size data.

The posture recognition unit 302 receives the captured image data from the image capture unit 301 and receives the human body data from the identification unit 307. The posture recognition unit 302 three dimensionally recognizes the posture of the user from the figure of the user in the captured image data and the human body data. The posture of a person may be recognized from the image data including the user and the human body data of the user as follows.

To begin with, it is assumed that the posture recognition unit 302 knows camera parameters of the image capture unit 301 in advance. The camera parameters include intrinsic camera parameters such as a focus length and an angle of view of the camera as well as a camera external parameters that indicate a position and an orientation of the camera in a real space.

The posture recognition unit 302 described above detects a head portion and a foot portion of the human body in the captured image data received from the image capture unit 301. For example, the posture recognition unit 302 may detect portions in the captured image data illustrated in FIG. 13A pointed by arrows as the head and foot portions, through a generally known method.

Under the assumption that the feet are not off the ground, the posture recognition unit 302 calculates the position of the foot portion in the real space. The calculation is based on the known camera parameters and a position $F_s(X_F, Y_F)$ of the foot portion detected in the captured image data, in a screen coordinate system on the captured image data. More specifically, the camera parameters of the image capture unit 301 are known. Thus, the a matrix $M_{wc}$ for converting a position in the world coordinate system into a position in the camera coordinate system of the image capture unit 301 and a matrix $M_{CS}$ for converting a position in the camera coordinate system of the image capture unit 301 into a position in the screen coordinate system on the captured image data are known. With the matrixes, the posture recognition unit 302 can convert a position $F_S(X_F, Y_F, Z_F)$, where $Z_F$ is an unknown variable, into a position $F_W(X_F, Y_F, Z_F)$ in the world coordinates as in the following Formula 2:

$$(x_F, y_F, z_F)^T = M_{wc}^{-1} \times M_{cs}^{-1} \times (X_F, Y_F, Z_F)^T \quad \text{(Formula 2)}.$$

Here, $x_F$, $y_F$, and $z_F$ can be obtained by solving a system of equations including Formula 2 described above, and $g(x_F, y_F, z_F)=0$ as a formula of a plane representing the ground. The position $F_W(x_F, y_F, z_F)$ thus obtained is the position of the foot portion in the real space.

Next, under the assumption that the distance between the head portion and the foot portion is equivalent to the height, the posture recognition unit 302 calculates the position of the head portion in the real space. The calculation is based on the known camera parameters and the position $H(X_H, Y_H)$ of the head portion detected in the captured image data, in the screen coordinate system of the captured image data. More specifically, the camera parameters of the image capture unit 301 are known. Thus, the matrix $M_{wc}$ for converting a position in the world coordinate system into a position in the camera coordinate system and the matrix $M_{CS}$ for converting a position in the camera coordinate system of the image capture unit 301 into a position in the screen coordinate system on the captured image data are known. With the matrixes, the posture recognition unit 302 can convert a position $H_s(X_H, Y_H, Z_H)$, where $Z_F$ is an unknown variable, into a position $H_w(x_H, y_H, z_H)$ in the world coordinate system as in the following Formula 3:

$$(x_H, y_H, z_H)^T = M_{wc}^{-1} \times M_{cs}^{-1} \times (X_H, Y_H, Z_H)^T \quad \text{(Formula 3)}.$$

Here, the following Formula 4 holds true:

$$(x_H - x_F)^2 + (y_H - y_F)^2 + (z_H - z_F)^2 + h^2 \quad \text{(Formula 4)}$$

where $F_W$ and $H_w$ are the positions of the foot and head portions respectively in the world coordinate system, and h is the height of a person that is assumed to be equal to the distance between the foot and head portions and is described in the human figure data.

Here, $H_w(x_H, y_H, z_H)$ can be obtained by solving a system of equations including Formula 3 and Formula 4. If two solutions are obtained, one closer to the viewpoint position of the image capture unit 301 in the world coordinate system may be obtained as the solution. Thus, the posture of the user can be three dimensionally recognized under the assumption that the user is leaning forward without bending the user's body.

Figure 13B:
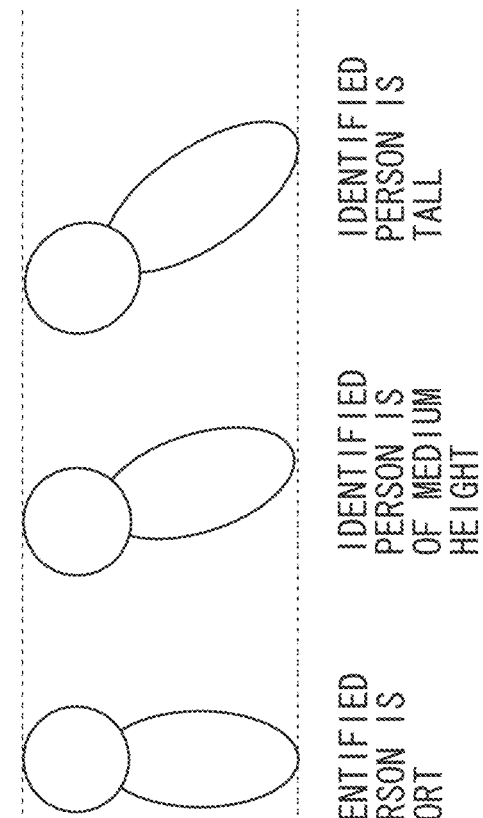
FIGS. 13A and 13B are diagrams illustrating processing performed by a posture recognition unit according to the third exemplary embodiment of the present invention.
Figure 13A:
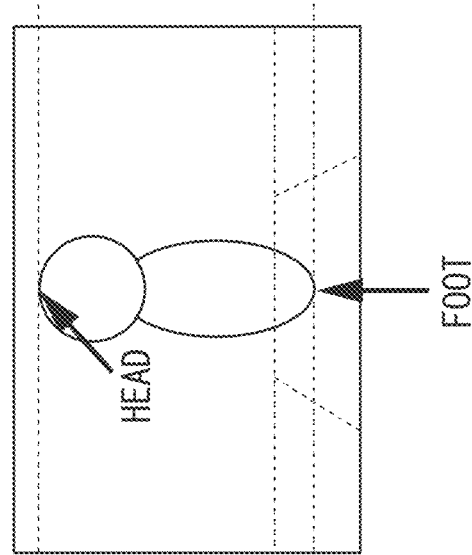

FIG. 13B schematically illustrates examples of three dimensional postures of users obtained by the calculation described above. More specifically, FIG. 13B illustrates examples of postures of an identified user who is short, an identified user who is of a medium height, and an identified user who is tall. FIG. 13B illustrates posture recognition examples under the assumption that the user is leaning forward without bending the user's body. It is a matter of course that the posture may be recognized under the assumption that the user is bending the user's body at the hip.

The posture recognition unit 302 outputs the posture recognition result to the posture visualization viewpoint setting unit 303 and the posture visualization unit 304. The posture visualization viewpoint setting unit 303 sets the position and orientation of the viewpoint from which the posture to be displayed to the user is viewed. The orientation and position set herein are relative orientation and position to the user, and are different from those of the imaging viewpoint (first viewpoint) of the image capture unit 301 to the user.

The third viewpoint set by the posture visualization viewpoint setting unit 303 is set as follows in the present exemplary embodiment for example. That is, the third viewpoint is set in such a manner that "the first viewpoint, the body part of the user viewed from the first viewpoint, and the third viewpoint are on the same plane", "the orientation of the third viewpoint is set to view the body part also viewed from the first viewpoint", and "the orientation of the first viewpoint and the orientation of the third viewpoint orthogonally cross one another". The position and orientation of the third viewpoint set by the posture visualization viewpoint setting unit 303 are output to the posture visualization unit 304.

Figure 15:
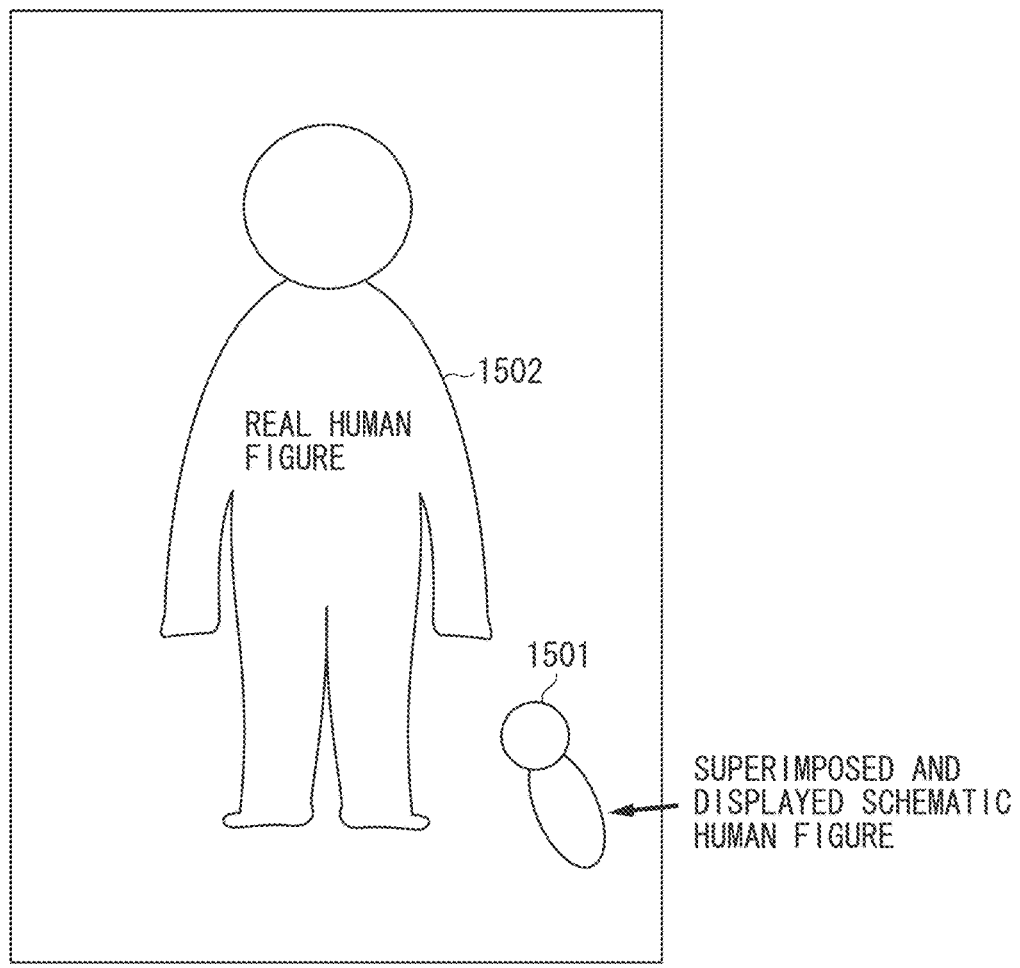
FIG. 15 is a diagram illustrating an example in which a mirror image of a user and a visualization result of a posture viewed from a viewpoint from which a better look of backward leaning can be obtained.

The posture visualization unit 304 visualizes the posture provided to the user so that the user can see and check the posture. Specifically, based on the posture recognition result received from the posture recognition unit 302, the posture visualization unit 304 visualizes a mirror image of a posture of the user viewed from the third viewpoint received from the posture visualization viewpoint setting unit 303. For example, the posture visualization unit 304 depicts the head portion of the human body with sphere CG, and depicts the rest of the body part with oval sphere CG, and thus the posture of the user is visualized as three human body models illustrated in FIG. 13B. Then the posture visualization unit 304 superimposes the visualization result on the captured image data received from the image capture unit 301. FIG. 15 is a diagram illustrating an example in which a visualization result 1501 (schematic human figure) by the posture visualization unit 304 according to the third exemplary embodiment is superimposed on the captured image data to be displayed. The image data obtained as illustrated in FIG. 15 is output to the space display unit 305 and the visualization result recording unit 309.

The visualization result recording unit 309 records the image data received from the posture visualization unit 304. The image data pieces received from the posture visualization unit 304 may each be recorded as independent image data, or chronologically combined into video data to be recorded. The space display unit 305 refers to the image data thus recorded.

The space display unit 305 is what is called a display. The image data received from the posture visualization unit 304 or image data recorded in the visualization result recording unit 309 and referred to by the space display unit 305 is flipped left side right so as to be displayed on the display as a mirror image. At that time, the mirror image of the posture visualized by the posture visualization unit 304 is superimposed on the displayed image data. Thus, the user standing in front of the space display unit 305 can see the mirror image of the real space including the user's figure viewed from the imaging viewpoint of the image capture unit 301 (first viewpoint) and the visualization result of the mirror image of the posture of the user viewed from a direction other than the front (third viewpoint).

Figure 14:
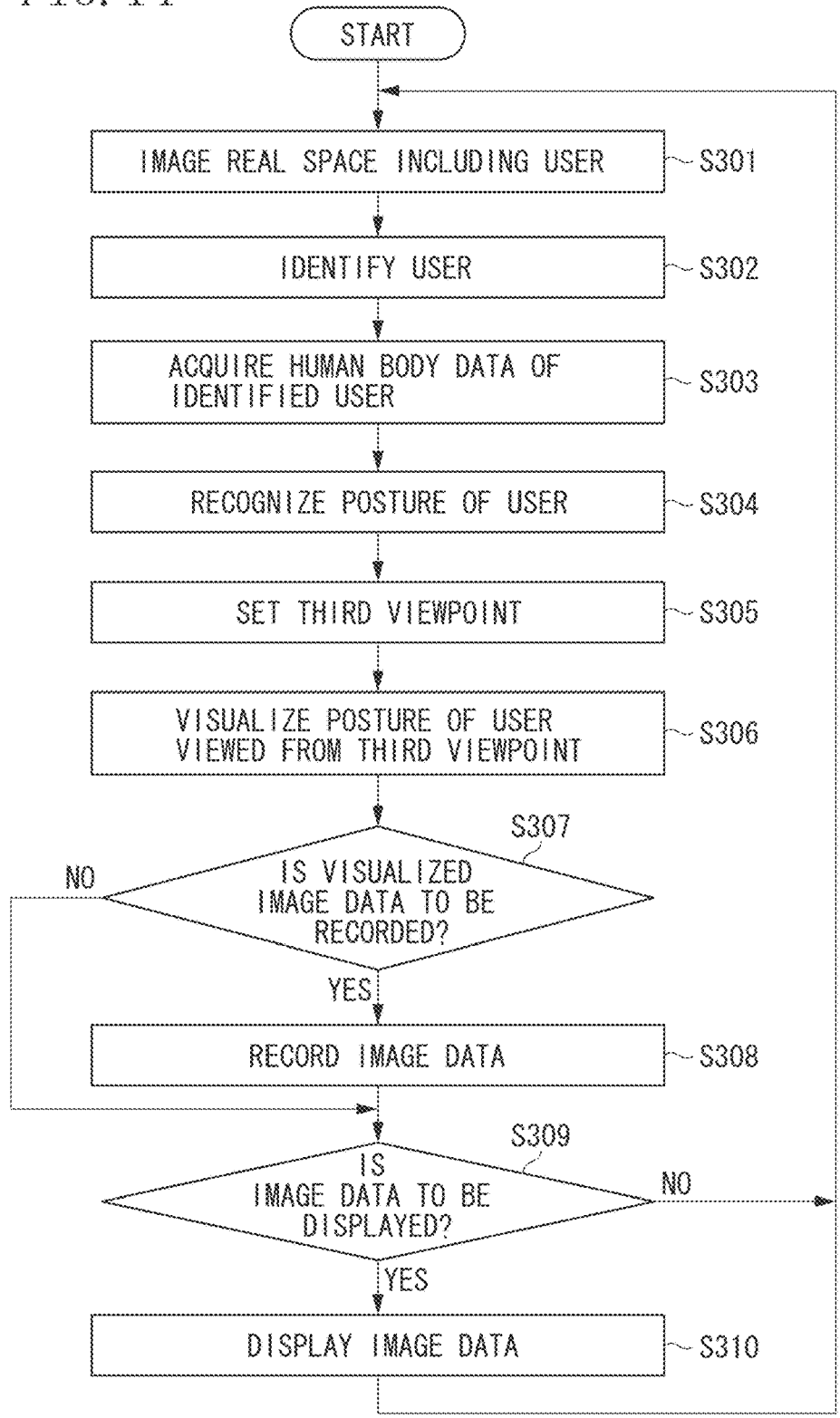
FIG. 14 is a flowchart illustrating processing performed by a posture visualization apparatus according to the third exemplary embodiment of the present invention.

Now, the processing performed by the posture visualization apparatus 300 according to the third exemplary embodiment of the present invention will be described with reference to FIG. 14. The processing illustrated in FIG. 14 starts when the user stands in front of the space display unit 305 and turns on the posture visualization apparatus 300. The processing illustrated in FIG. 14 is executed when a CPU in the posture visualization apparatus 300 according to the present exemplary embodiment reads and executes required data and a program in a recording medium such as a ROM.

In step S301, the image capture unit 301 captures an image of the real space including the user standing in the field of view. Then, the image capture unit 301 outputs the captured image data to the posture recognition unit 302, the identification unit 307, and the space display unit 305.

In step S302, the identification unit 307 identifies the user included in the captured image data received from the image capture unit 301 by referring to the personal data stored in the personal data storage unit 306.

In step S303, the identification unit 307 refers to the human body data linked to the person identified in step S302 in the personal data storage unit 306, and outputs the referred data to the posture recognition unit 302.

In step S304, the posture recognition unit 302 three dimensionally recognizes the posture of the user from the captured image data including the user received from the image capture unit 301 and the human body data of the user received from the identification unit 307. The posture recognition result is output to the posture visualization viewpoint setting unit 303 and the posture visualization unit 304. The posture recognition method in step S304 may be performed in the first and the second exemplary embodiments.

In step S305, the posture visualization viewpoint setting unit 303 sets the position and orientation of the viewpoint (third viewpoint) from which the posture provided to the user is viewed. The position and orientation of the third viewpoint are output to the posture visualization unit 304.

In step S306, the posture visualization unit 304 visualizes the mirror image of the posture of the user viewed from the third viewpoint received from the posture visualization viewpoint setting unit 303 based on the posture recognition result received from the posture recognition unit 302. The posture visualization unit 304 superimposes the visualization result on the captured image data received from the image capture unit 301.

In step S307, the posture visualization apparatus 300 determines whether setting in which recording image data visualized by the posture visualization unit 304 is recorded in the visualization result recording unit 309 has been made. If the setting in which the image data visualized by the posture visualization unit 304 is recorded in the visualization result recording unit 309 has been made by a setting unit not illustrated in FIG. 12 (YES in step S307), the image data visualized by the posture visualization unit 304 is output to the posture visualization unit 304, and then the processing proceeds to step S308. On the other hand, if such a setting has not been made (NO in step S307), the processing proceeds to step S309.

In step S308, the visualization result recording unit 309 records the image data received from the posture visualization unit 304. In step S309, the posture visualization apparatus 300 determines whether setting in which the space display unit 305 displays the image data has been made. If the setting in which the space display unit 305 displays the image data has been made by a setting unit not illustrated in FIG. 12 (YES in step S309), the processing proceeds to step S310. On the other hand, if such a setting has not been made (NO in step S309), the processing returns to step S301.

In step S310, the space display unit 305 displays the image data. When the processing proceeds to step S310 through step S308, the space display unit 305 displays the image data recorded in the visualization result recording unit 309. When the processing proceeds to step S310 without performing the operation in step S308, the space display unit 305 receives image data visualized by the posture visualization unit 304 and displays the image data. Then, the processing returns to step S301, and the processing is repeated until the user stops using the posture visualization apparatus 300.

Through the processing described above, the posture visualization apparatus 300 displays to the user, as illustrated in FIG. 15, the mirror image 1502 of the posture of the user and the visualization result 1501 of the posture viewed from a viewpoint from which forward or backward leaning that is difficult to check from the mirror image 1502 can be more clearly seen. Thus, the user can visually check the user's outfit while checking whether the user's posture in a front and back direction is good. How a user's figure looks changes in accordance with the user's posture. Thus, the user of the posture visualization apparatus 300 according to the present exemplary embodiment can change the user's clothes or try on while clearly checking the relationship between a posture and a look.

The image capture unit 301 of the posture visualization apparatus 300, which is disposed above the space display unit 305 in the present exemplary embodiment, may also be disposed anywhere else such as below or beside the space display unit 305.

The image capture unit 301 according to the third exemplary embodiment is a visible light camera disposed above the space display unit 305 to which the user faces forward. The posture visualization apparatus 300 according to the third exemplary embodiment includes the posture visualization viewpoint setting unit 303, the posture visualization unit 304, the identification unit 307, and the personal data storage unit 306. Thus, the visualization result of the posture viewed from a viewpoint different from the imaging viewpoint (first viewpoint) of the image capture unit 301 can be displayed to the user. The visualization result is displayed together with the mirror image of the captured image data from the image capture unit 301 that captures an image of the real space including the user. Therefore, the user can see at a glance how the user looks and whether the user is standing straight or leaning leftward, rightward, forward, or backward. Thus, in the third exemplary embodiment, the posture viewed from the front and the posture viewed from any direction other than the front can be displayed to the user simply by disposing a system including the visible light camera in front of the user.

In the first to the third exemplary embodiments, the posture of the user is recognized based on the image data of the real space captured by the image capture unit. The posture viewed from a direction other than the front is visualized based on the recognition result to be displayed to the user. Thus, the image capture unit can be disposed at any position, whereby limitations on the arrangement of the system as a whole are reduced. Therefore, the system as a whole can be installed in a smaller space, or can be arranged in accordance with an installed space. Further, the posture displayed to the user includes the posture in image data captured by the image capture unit and the posture visualized from the posture recognition result. Therefore, the orientation of the posture displayed to the user can be freely changed.

The image capture unit in the exemplary embodiments described above may be any unit that captures an image of the real space including the user. For example, the image capture unit may be the distance measurement camera described in the first exemplary embodiment, the plurality of cameras described in the second exemplary embodiment, and the visible light camera described in the third exemplary embodiment. Furthermore, the image capture unit may be an infrared camera, a line camera, or an ultraviolet camera.

The space display unit in the exemplary embodiments described above may be any unit that can display an image of a space. For example, the space display unit may be the one formed by providing the display behind the half mirror as described in the first exemplary embodiment, or the display described in the second and the third exemplary embodiments. Furthermore, the space display unit may be a stereoscopic display or a projector picture plane.

The posture recognition unit in the exemplary embodiments may be any unit that recognizes a displayed posture of a user. More specifically, the posture recognition unit may three dimensionally recognize the posture of the user from the human body shape of the user in distance information, obtain the three dimensional shape of the human body in a plurality of images, or positions of the human body parts in an image and known human body data. Furthermore, it is a matter of course that the posture recognition unit may mark a person and recognize the person's posture.

The posture visualization viewpoint setting unit in the exemplary embodiments described above may any unit that sets a viewpoint (third viewpoint) different from an imaging viewpoint of the image capture unit (first viewpoint) and a viewpoint from which a space displayed by the space display unit (second viewpoint) is viewed. More specifically, the posture visualization viewpoint setting unit may set the third viewpoint as a position at a height that is the same as that of a part A of the user and rotated by ±90° about the user, set the third viewpoint by using entropy E representing the visibility of the human body, and may set the third viewpoint based on the positional relationship between the first viewpoint and a human body part.

The posture visualization unit in the exemplary embodiments described above may be any unit that visualizes a posture of the person viewed from the third viewpoint based on the recognition result of the posture recognition unit. More specifically, the posture visualization unit may depict the human body part with the sphere CG and connection between the body parts with the cylinder CG as illustrated in FIG. 2, or directly depict a three dimensional shape of the human body as schematically illustrated in FIG. 9. Furthermore, the posture visualization unit may depict the head and the body by combining the sphere CG and the elliptical sphere CG as illustrated in FIG. 13B.

The reference posture in the exemplary embodiments described above may be any posture that can be compared with the posture of the user. For example, the reference posture may be the posture performing a correct exercise and the posture of the user performing the exercise in the past that are described in the first exemplary embodiment. Furthermore, the reference posture may be a posture of an incorrect exercise, and a posture of an exercise estimated to be performed in the future.

The posture comparison unit in the exemplary embodiments may be any unit that compares the posture of the user and the reference posture. For example, the posture comparison unit may be the unit that calculates the difference between the posture of the user and the reference posture in the angle of joints as described in the first exemplary embodiment. Furthermore, the posture comparison unit may calculate the difference between the posture of the user and the reference posture in a position of a joint, or force applied to the joint.

The data stored in the personal data storage unit in the exemplary embodiments may be any data that is used for identifying a person or indicating a physical size of a person. The face image linked to a person described in the third exemplary embodiment is an example of the data used for identifying a person. The data may be fingerprint data and voice print data linked to a person. The height data of a person described in the third exemplary embodiment is an example of data indicating the shape of the person. Furthermore, the data may be data indicating the chest measurement, or the face size.

An exemplary embodiment of the present invention may be applied to the object to visualize a posture during a rehabilitation exercise, a sport exercise, a dance exercise, or postures during a dressing movement and servicing movement.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-006308 filed Jan. 17, 2013, which is hereby incorporated by reference herein in its entirety.

What is claimed is:

1. An image processing apparatus comprising:
    a recognition unit configured to recognize, based on a first image captured by an image capture unit from a first viewpoint, a posture of an object in the first image;
    a setting unit configured to set a second viewpoint for displaying a space virtually including the object and a third viewpoint to see the posture of the object, based on the posture of the object recognized by the recognition unit;
    a generation unit configured to generate, at the time at which the first image was captured by the image capture unit, a second image of the space in which the posture of the recognized object is located as a visualization of a model of the object being viewed from a virtual camera at the second viewpoint, and a third image of the posture of the object as a visualization of the model of the object being viewed from another virtual camera at the third viewpoint; and a display control unit configured to display the second image of the space and the third image of the recognized posture of the object generated by the generation unit on a display unit.

2. The image processing apparatus according to claim 1, wherein the display control unit flips displays the image of the space and the image of the posture of the object viewed from the third viewpoint generated by the generation unit as a mirror reversed image left side right and displays the resultant images on the display unit.

3. The image processing apparatus according to claim 1,
wherein the generation unit, based on posture data indicating a reference posture, generates the reference posture viewed from the third viewpoint, and
wherein the display control unit further displays the reference posture viewed from the third viewpoint generated by the generation unit on the display unit.

4. The image processing apparatus according to claim 3 further comprising a comparison unit configured to compare the posture of the object viewed from the third viewpoint and the reference posture viewed from the third viewpoint,
wherein the display control unit further displays a comparison result of the comparison unit on the display unit.

5. The image processing apparatus according to claim 1 further comprising a recording unit configured to record a result obtained by the generation unit,
wherein the display control unit displays the result recorded in the recording unit on the display unit.

6. The image processing apparatus according to claim 1, wherein the first viewpoint, the second viewpoint, and the third viewpoint are different from each other.

7. An image processing method performed by an image processing apparatus, the image processing method comprising:
recognizing, based on a first image captured by an image capture unit from a first viewpoint, a posture of an object in the first image;
setting a second viewpoint for displaying a space virtually including the object and a third viewpoint to see the posture of the object, based on the posture of the recognized object;
generating, at the time at which the first image was captured by the image capture unit, a second image of the space in which the recognized posture of the object is located as a visualization of a model of the object being viewed from a virtual camera at the second viewpoint, and, a third image of the recognized posture of the object being viewed from another virtual camera at the third viewpoint; and
performing a display control so that the generated second image of the space and the generated third image of the recognized posture of the object are displayed on a display unit.

8. A non-transitory storage medium storing a program having computer executable instructions, upon execution cause a computer to perform:
recognizing, based on a first image captured by an image capture unit from a first viewpoint, a posture of an object in the first image;
setting a second viewpoint for displaying a space virtually including the object and a third viewpoint to see the posture of the object, based on the posture of the recognized object;
generating, at the time at which the first image was captured by the image capture unit, a second image of the space in which the recognized posture of the object is located as a visualization of a model of the object being viewed from a virtual camera at the second viewpoint, and, a third image of the recognized posture of the object being viewed from another virtual camera at the third viewpoint; and
performing a display control so that the generated second image of the space and the generated third image of the recognized posture of the object are displayed on a display unit.

* * * * *